United States Patent [19]

Yamaguchi et al.

[11] Patent Number: 5,200,253

[45] Date of Patent: Apr. 6, 1993

[54] HOLOGRAM FORMING SHEET AND PROCESS FOR PRODUCING THE SAME

[75] Inventors: Masahisa Yamaguchi; Hitoshi Fujii; Shuichi Kobayashi; Takahiro Kawai, all of Tokyo, Japan

[73] Assignee: Dai Nippon Insatsu Kabushiki Kaisha, Japan

[21] Appl. No.: 562,316

[22] Filed: Aug. 3, 1990

[30] Foreign Application Priority Data

| Aug. 9, 1989 | [JP] | Japan | 1-204691 |
| Aug. 9, 1989 | [JP] | Japan | 1-204692 |
| Aug. 9, 1989 | [JP] | Japan | 1-204693 |
| Aug. 9, 1989 | [JP] | Japan | 1-204697 |
| Aug. 9, 1989 | [JP] | Japan | 1-204698 |
| Aug. 9, 1989 | [JP] | Japan | 1-204699 |
| Aug. 9, 1989 | [JP] | Japan | 1-204700 |
| Dec. 20, 1989 | [JP] | Japan | 1-329949 |
| May 29, 1990 | [JP] | Japan | 2-56081[U] |

[51] Int. Cl.$^5$ .............................................. B32B 9/00
[52] U.S. Cl. .................................... 428/195; 428/916; 428/915; 428/537.5; 428/200; 264/2.5; 264/1.7
[58] Field of Search ............... 428/915, 916, 537.5, 428/200, 195

[56] References Cited

U.S. PATENT DOCUMENTS

| 4,452,842 | 6/1984 | Borges et al. | 428/195 |
| 4,684,795 | 8/1987 | Colgate et al. | 235/457 |
| 4,728,377 | 6/1988 | Gallagher | 156/58 |
| 4,856,857 | 8/1989 | Takeuchi et al. | 350/3.6 |
| 4,971,646 | 11/1990 | Schell et al. | 156/244 |

FOREIGN PATENT DOCUMENTS 242745 4/1988 Japan .

Primary Examiner—Patrick J. Ryan
Assistant Examiner—Cathy Lee
Attorney, Agent, or Firm—Ladas & Parry

[57] ABSTRACT

A thin film of molten polypropylene resin extruded from a T die is pressed and cooled with a chill roll equipped with a hologram relief master plate on its peripheral surface, whereupon a hologram pattern is simultaneously formed as an integral part of the polypropylene resin sheet being molded. Since the polypropylene resin has a Rockwell hardness of at least 70, the hologram pattern formed in the resulting hologram forming sheet is less likely to be damaged or lost during subsequent processing.

20 Claims, 12 Drawing Sheets

HOLOGRAM FORMING SHEET AND PROCESS FOR PRODUCING THE SAME

FIELD OF THE INVENTION

This invention relates to a hologram forming sheet, and more particularly to a hologram forming sheet having a hologram pattern formed on a polypropylene resin layer having a Rockwell hardness (ASTM D785 Rockwell R scale) of at least 70. This invention also relates to a process for producing such a hologram forming sheet, and more particularly to a process for producing a hologram forming sheet in which the formation of a hologram pattern is accomplished simultaneously with sheet forming by extrusion molding.

BACKGROUND OF THE INVENTION

Sheeting for wrapping various goods and articles on the market has conventionally had patterns and pictures formed by such methods as printing and hot-stamping. The exterior of containers such as cartons or displays for goods have also been provided with various patterns by printing, hot-stamping and other suitable methods in order to improve the image of the goods of interest. However, the patterns and pictures provided on the conventional wrapping sheets, containers and displays are two-dimentional and are incapable of completely satisfying the recent growing need of the industry for improving the aesthetic appeal of packaging materials such as wrapping sheets and cartons, as well as displays on goods. To meet this need, it is desired that patterns, pictures and other images be adapted to vary in shape by themselves.

Under these circumstances, hologram forming sheets that have preformed hologram patterns are used as wrapping sheets. A conventional process for producing such hologram forming sheets consists of embossing a resin sheet with a stamper that has a hologram relief formed thereon, and then forming a metal layer on the patterned surface of the resin by vacuum evaporation. In this process, however, the formation of a hologram pattern on the resin sheet by embossing involves reheating of the once formed thermoplastic resin sheet. Such an extra step not only reduces the operational efficiency but also causes a substantial energy loss, thus making said process unsuitable for large-scale production of hologram forming sheets. With a view to solving this problem, an improved process for producing a hologram forming sheet has been proposed, in which process a hologram with a surface relief can be obtained by extrusion molding technology (see Unexamined Published Japanese Patent Application No. 191872/1987). However, if the resin sheet on which a hologram pattern is to be formed has low hardness, the hologram forming sheet produced by this process has low machinability (i.e., adaptability for mechanical working) since the hologram pattern will be damaged or lost during the formation of a hologram or in subsequent process.

SUMMARY OF THE INVENTION

An object, therefore, of the present invention is to provide a hologram forming sheet that is free from the aforementioned problems of the prior art and that has high machinability.

Another object of the present invention is to provide a process for producing a hologram forming sheet that has high operational efficiency and that experiences small energy loss.

According to a first aspect of the present invention, there is provided a hologram forming sheet comprising a polypropylene resin sheet with a Rockwell hardness (ASTM D785 Rockwell R scale) of at least 70 and a hologram pattern forming surface provided on one side of said polypropylene resin sheet, said hologram pattern forming surface being provided simultaneously with the molding of said polypropylene resin sheet in such a way that a polypropylene resin with a Rockwell hardness of at least 70 that has been extruded as a molten thin film from a T die is pressed and cooled with a chill roll equipped with a hologram relief master plate on its peripheral surface.

According to a second aspect of the present invention, there is provided a hologram forming sheet comprising a substrate sheet, a polypropylene resin layer with a Rockwell formed on one side of said hardness (ASTM D785 Rockwell R scale) of at least 70 that is substsate sheet, and a hologram pattern forming surface provided on said polypropylene resin layer, said hologram pattern forming surface being provided simultaneously with the molding of said polypropylene resin layer in such a way that a polypropylene resin with a Rockwell hardness of at least 70 that has been extruded as a molten thin film from a T die is pressed and cooled with a chill roll equipped with a hologram relief master plate on its peripheral surface.

In accordance with said first and second aspects of the present invention, the chance of damaging of the hologram pattern forming surface or of the loss of the hologram pattern is sufficiently reduced to produce a hologram forming sheet having improved machinability.

According to a third aspect of the present invention, there is provided a process for producing a hologram forming sheet, in which a hologram pattern forming surface is provided simultaneously with the molding of a polypropylene resin sheet in such a way that a polypropylene resin with a Rockwell hardness of at least 70 that has been extruded as a molten thin film from a T die is pressed and cooled with a chill roll equipped with a hologram relief master plate on its peripheral surface.

According to a fourth aspect of the present invention, there is provided a process for producing a hologram forming sheet, in which a hologram pattern forming surface is provided simultaneously with the molding of a polypropylene resin layer in such a way that a polypropylene resin with a Rockwell hardness of at least 70 that has been extruded onto one side of a substrate sheet as a molten thin film from a T die is pressed and cooled with a chill roll equipped with a hologram relief master plate on its peripheral surface.

In accordance with said third and fourth aspect of the present invention, a hologram pattern is formed simultaneously with the molding of a polypropylene resin sheet or layer as an integral part thereof, and this not only provides an increased operational efficiency in the formation of a hologram but also reduces the potential energy loss. Further, the polypropylene resin from which to form a sheet or layer that carries the hologram pattern forming surface has a Rockwell hardness of at least 70, so that the hologram pattern formed on the resulting hologram forming sheet is satisfactorily protected against potential damage or loss.

DESCRIPTION OF THE PREFERRED EMBODIMENTS

The preferred embodiments of the present invention are described below with reference to the accompanying drawings.

Figure 1:
FIG. 1 is a cross-sectional view of a hologram forming sheet according to one embodiment of the present invention.

To begin with, a first example of the hologram forming sheet of the present invention is described with reference to FIGS. 1 to 4. FIG. 1 shows a cross section of a hologram forming sheet according to an embodiment of the present invention. The hologram forming sheet which is generally indicated by 1 in FIG. 1 is a sheet of polypropylene resin having a Rockwell hardness of at least 70, and a hologram pattern forming surface 2 is provided on one side of said polypropylene resin sheet as an integral part thereof. The hardness of the polypropylene resin to be used in the present invention is specified to be at least 70 on the Rockwell scale (ASTM D785 Rockwell R scale) in order to prevent the hologram pattern formed in the procedure to be described below from being damaged or lost on account of various factors. The polypropylene resin may be a homopolymer of propylene or a graft copolymer of propylene and ethylene, with a propylene homopolymer being particularly preferred. The polypropylene resin preferably does not contain any additive that will gasify during the step of forming a reflecting metal layer which is to be described below.

The thickness of the hologram forming sheet 1 is preferably on the order of 5-100 μm, with the range of ca. 15-30 μm being particularly preferred. If the thickness of the hologram forming sheet 1 is less than 5 μm, it will have neither adequate sheet strength nor adequate adhesion to a substrate sheet which is to be laminated with it as described hereinafter. If the thickness of the hologram forming sheet 1 is greater than 30 μm, its transparency decreases and, if it is thicker than 100 μm, the resolution of the hologram will decrease.

Figure 2:
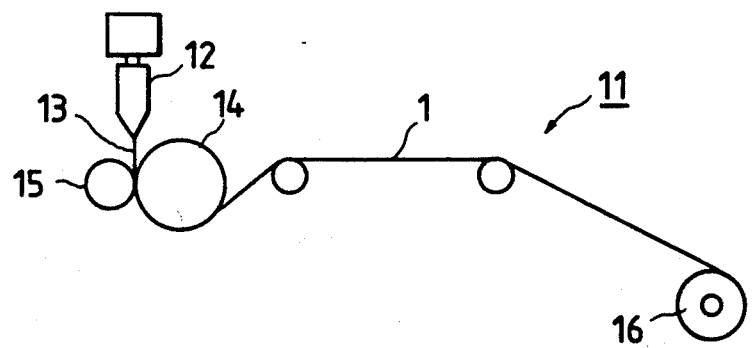
FIG. 2 is a schematic diagram of an extrusion laminator for use in the production of the hologram forming sheet shown in FIG. 1.

FIG. 2 shows schematically an extrusion laminator for use in the production of the hologram forming sheet 1 shown in FIG. 1. As shown in FIG. 2, the extrusion laminator generally indicated by 11 comprises a T die 12 through which a molten polypropylene resin is extruded as a thin film, a chill roll 14 and a nip roll 15 for pressing and cooling the molten thin film of polypropylene resin 13 extruded from the T die 12, and a winder 16 for taking up the molded hologram forming sheet 1.

The T die 12 is not limited in any particular way and any conventional T dies for molding synthetic resin sheets can be used.

Figure 3:
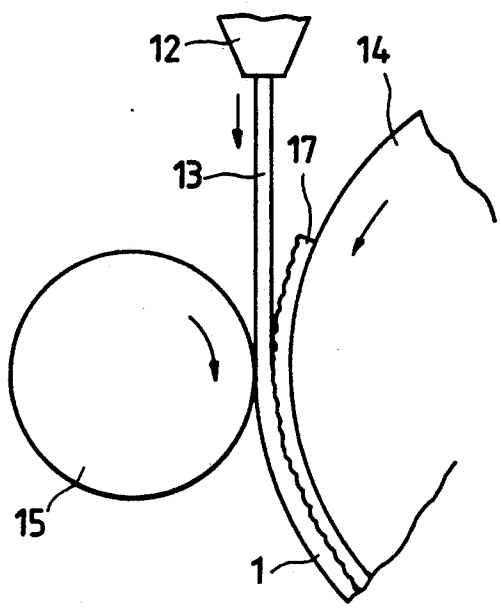
FIG. 3 is a partial enlarged view of the chill roll in the extrusion laminator shown in FIG. 2.

FIG. 3 is a partial enlarged view of the chill roll 14 in the extrusion laminator 11 shown in FIG. 2. As shown in FIG. 3, the chill roll 14 has a hologram relief master plate 17 provided on its peripheral surface. Various types of hologram relief master plates can be used in the present invention and typical examples include: (1) a relief plate (pressed master plate) prepared by a process consisting of forming a secondary hologram surface having interference fringes in relief recorded thereon with a photoresist used as a light-sensitive material, depositing a chemical silsver plate on said hologram surface, further depositing a nickel (Ni) plate over the silver plate, and strippling the metallic Ni film; (2) a relief plate that is the same as the pressed master plate (1) except that another Ni plate is deposited on the stripped surface relief, with the metallic Ni film being then stripped; and (3) a relief plate formed by hot-pressing a thermoplastic resin sheet or film with the relief palte (2). From the viewpoint of durability during extrusion molding, the Ni relief plates (1) and (2) are preferred.

The hologram relief master plate 17 may be provided on the peripheral surface of the chill roll 14 by various methods including bonding with an adhesive, fixing by vacuum suction and mounting with bolts, and any of these methods can be employed as long as the master plate 17 is securely provided and will not be dislodged during extrusion molding. More than one master plate 17 can be provided on the peripheral surface of the chill roll 14 and the number of master plates to be provided, the pattern of their arrangement, the distance between adjacent master plates and other factors may be appropriately selected in accordance with the hologram forming sheet to be produced. If necessary, the hologram relief master plate 17 provided on the peripheral surface of the chill roll 14 may be replaced by other suitable hologram relief master plates and this permits various hologram patterns to be formed on a polypropylene resin sheet of the same shape in accordance with the specific object of use.

The temperature of the chill roll 14 can be determined from such factors as the film thickness and throughput of the polypropylene resin 13 being extruded from the T die 12 and the range of ca. 15° to 25° C. is usually preferred.

The thin film of molten polypropylene resin 13 extruded from the T die 12 in the extrusion laminator 11 is molded into a sheet 1 by being pressed and cooled with the chill roll 14 and the nip roll 15. At the same time, a hologram pattern is formed as an integral part of the sheet 1 by being transferred from the hologram relief master plate 17 provided on the peripheral surface of the chill roll 14.

Figure 4:
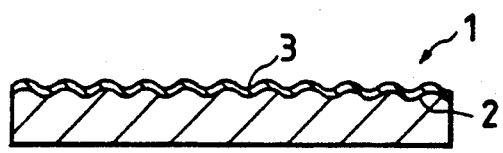
FIG. 4 is a cross-sectional view of a hologram forming sheet which is a modification of the sheet shown in FIG. 1.

FIG. 4 is a cross-sectional view of a modification of the hologram forming sheet 1 shown in FIG. 1, in which a reflecting metal layer 3 is provided on the hologram pattern forming surface 2. The reflecting metal layer 3 may be formed by vacuum evaporation, sputtering, ion plating or other suitable treatments of a metal such as aluminum or a metal oxide such as zinc oxide.

Instead of the reflecting metal layer 3, a thin layer of a compound or a resin that preferably have a refractive index difference of at least 0.5 from the resin on which the hologram pattern is formed, say, a transparent compound such as zinc sulfide (ZnS) or antimony-sulfide ($Sb_2S_3$) may be formed, and this enables the preparation of a hologram forming sheet that is transparent in itself but which is capable of efficient reproduction of a holographic image.

A second example of the hologram forming sheet of the present invention is described below with reference to FIGS. 5 and 6.

Figure 5:
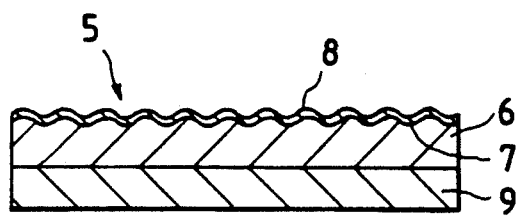
FIG. 5 is a cross-sectional view of a hologram forming sheet according to another embodiment of the present invention.

FIG. 5 is a cross-sectional view of a hologram forming sheet according to another embodiment of the present invention. As shown, the hologram forming sheet generally indicated by 5 comprises a polypropylene resin layer 6 having a hologram pattern forming surface 7 provided thereon, a reflecting metal layer 8 provided on the hologram pattern forming surface 7, and a substrate sheet 9 having the polypropylene resin layer 6 provided on one side. The substrate sheet 9 may be formed on any suitable material such as a drawn polypropylene film, a polycarbonate film, a polyester film or a cellophane film. The thickness of the substrate sheet 9 is preferably on the order of 10-200 $\mu$m.

Figure 6:
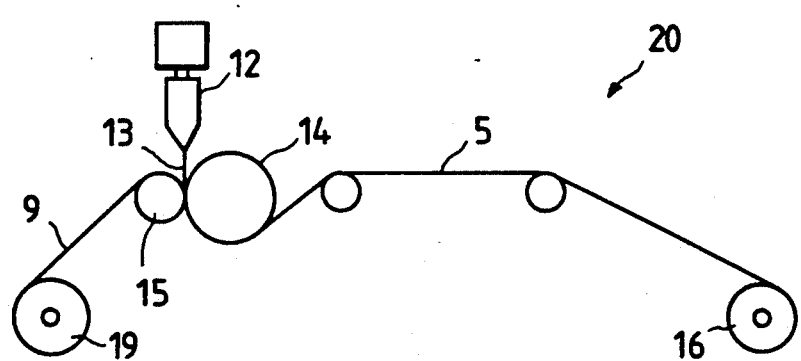
FIG. 6 is a schematic diagram of an extrusion laminator for use in the production of the hologram forming sheet shown in FIG. 5.

FIG. 6 shows schematically an extrusion laminator for use in the production of the hologram forming sheet 5 shown in FIG. 5. The extrusion laminator generally indicated by 20 in FIG. 6 is the same as the extrusion laminator 11 shown in FIG. 1 except that an unwinder 19 is provided to supply the substrate sheet 9 into the gap between the chill roll 14 and the nip roll 15. Because of this arrangement, the thin film of molten polypropylene resin 13 extruded from the T die 12 in the laminator 20 is laminated over the substrate sheet 9 and thereafter pressed and cooled with the chill roll 14 and the nip roll 15 to be molded into a sheet 5. At the same time, a hologram pattern is formed as an integral part of the polypropylene resin layer 6 by being transferred from the hologram relief master plate 17 provided on the peripheral surface of the cill roll 14. The parts of the laminator 20 which are the same as those of the laminator 11 shown in FIG. 2 are identified by like numerals and will not be described in detail.

If necessary, an anchor agent, an adhesive or some other suitable material may be coated on the side of the substrate sheet 9 where it is to be laminated with the molten polypropylene resin 13.

The second embodiment of the present invention is described below in greater detail with reference to the results of an experiment conducted in line with this embodiment.

EXPERIMENT 1

Using an extrusion laminator of the type shown in FIG. 6, a polypropylene resin (see below) was extrusion-laminated over a substrate sheet (see below) under the conditions of extrusion specified below, whereby a hologram forming sheet (sample No. 1) was prepared. A hologram relief master plate prepared by a process consisting of depositing another Ni plate on the stripped surface relief of a pressed master plate and then stripping the metallic Ni film was bonded to the peripheral surface of the chill roll by means of an adhesive.

Polypropylene resin: LA-221 of Mitsui Petrochemical Industries, Ltd.; MFR (index of processability)=23 g/10 min.; Rockwell hardness=95.

Substrate sheet: drawn polypropylene film (20 $\mu$m thick)
Conditions of extrusion:
L/D of screw=24
cylinder temperature=160° C., 180° C., 240° C.
adapter temperature=260° C.
T die temperature=280° C.
thickness of laminate=15 $\mu$m
temperature of chill roll=23° C.

Another hologram forming sheet (sample No. 2) was prepared by repeating the procedure described above except that the polypropylene resin was F 650 of Mitsui Petrochemical Industries, Ltd. with an MFR value of 6.0 and a Rockwell hardness of 75.

As a comparison, an additional hologram forming sheet (comparative sample) was prepared by repeating the procedure described above except that the polypropylene resin was L-840 of Mitsui Petrochemical Industries, Ltd. with an MFR value of 21 and a Rockwell hardness of 65.

Each of the three samples thus prepared was set in a 6-color gravure printing press and printing was made on the side of the substrate sheet opposite the hologram forming surface at a speed of 150 m/min., followed by drying at 70° C. The hologram forming surface of each sample was examined for any damage or loss of the hologram pattern. Little damage or loss of the hologram pattern was detected on sample Nos. 1 and 2 but many flaws or losses occurred in the hologram pattern of the comparative sample. This obviously demonstrated the effectiveness of the present invention.

Figure 7:
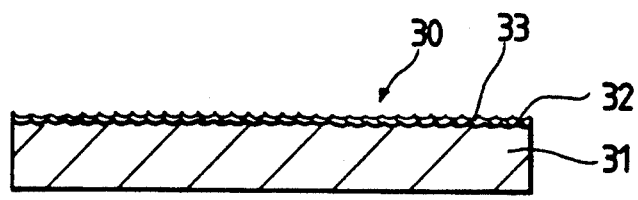
FIGS. 7 to 9 are cross-sectional views that show schematically the process of producing a hologram forming sheet according to still another embodiment of the present invention.

A third example of the hologram forming sheet of the present invention is described below with reference FIGS. 7 to 9, which are cross-sectional views showing schematically the successive steps of producing the hologram forming sheet of the present invention. In FIG. 7, the hologram forming sheet generally indicated by 30 comprises a polypropylene resin sheet 31 having a hologram pattern forming surface 32 provided thereon and a reflecting metal layer 33 provided over the hologram pattern forming surface 32. As in the first example, the polypropylene resin sheet 31 is chiefly composed of a polypropylene resin having a Rockwell hardness of at least 70, and its thickness is preferably on the order of 5 to 100 μm. A hologram pattern forming surface can be provided on the polypropylene resin sheet 31 by either one of the methods illustrated in FIGS. 2 and 3.

The reflecting metal layer 33 may be formed by vacuum evaporation, sputtering, ion plating or other suitable treatments of a metal such as aluminum or a metal oxide such as zinc oxide. The reflecting metal layer 33 preferably has a thickness that is usually on the order of 20 to 70 nm.

Figure 8:
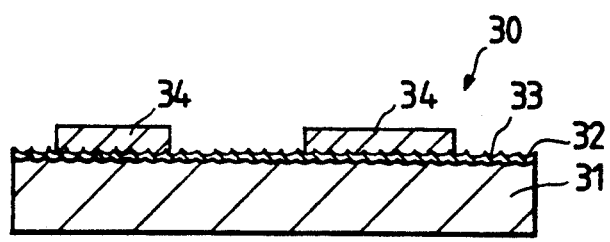

In the next step, an ink layer 34 is provided in selected areas of the reflecting metal layer 33 (see FIG. 8). The areas in which the ink layer 34 is to be provided are properly determined considering which areas of the hologram pattern forming surface need not be transparent depending on the specific use of sheets or wrapping bags, or which areas are preferably provided with the reflecting metal layer from an artistic design and other viewpoints. The ink layer 34 may be provided by any suitable technique such as gravure printing with etching inks. Etching inks to be used must resist the removal of the reflecting metal layer 33 with a liquid etchant such as an aqueous solution of hydrofluoric acid or sodium hydroxide in the subsequent etching step (to be described just below) and they are also required to have good printability. Examples of etching inks that meet these requirements are "VM Pearl", VF.FIT, etc. of Dainichiseika Colour & Chemicals Mfg. Co., Ltd. The ink layer 34 preferably has a thickness that is usually on the order of 1 to 3 μm. The ink layer 34 may be formed of a clear or color ink depending on the need.

Figure 9:
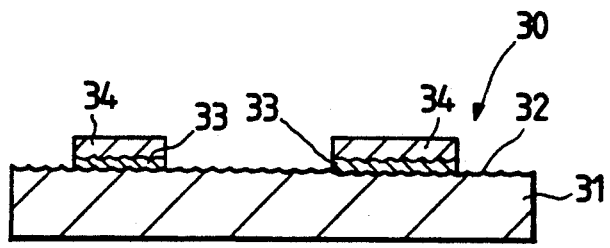

In the subsequent step, with the ink layer 34 used as a mask, the entire part of the reflecting metal layer 33 except where the ink layer 34 is provided is removed with a liquid etchant such as an aqueous solution of hydrofluoric acid or sodium hydroxide (see FIG. 9). The liquid etchant may be applied by any known method such as dipping or spraying. In this way, the entire part of the metal reflecting layer 33, excepting selected areas, that is provided on the hologram pattern forming surface 32 of the polypropylene resin sheet 31 is removed to produce a hologram forming sheet 30 that consists of two parts, one being transparent regions and the other being regions provided with the reflecting metal layer.

The third example of the present invention is described below in greater detail with reference to the results of an experiment conducted in line with this example.

EXPERIMENT 2

Using an extrusion laminator of the type shown in FIG. 2, a polypropylene resin (see below) was extrusion-laminated under the conditions of extrusion specified below, whereby a hologram forming sheet was prepared. A hologram relief master plate prepared by a process consisting of depositing another Ni plate on the stripped surface relief of a pressed master plate and then stripping the metallic Ni film was bonded to the peripheral surface of the chill roll by means of an adhesive.

Polypropylene resin: FW-163 of Union Polymer Co., Ltd. (Rockwell hardness=100).

Conditions of extrusion:
L/D of screw=24
cylinder temperature=160° C., 180° C., 240° C.
adapter temperature=260° C.
T die temperature=280° C.
thickness of laminate=60 μm
temperature of chill roll=23.

An aluminum layer was evaporated in a thickness of 50 nm in selected areas of the hologram forming sheet. Thereafter, an ink layer was provided in selected areas of the aluminum layer by gravure printing with a clear polyvinyl chloride resin ink ("VM Pearl" Dainichiseika Color & Chemicals Mfg., Co., Ltd.). By subsequent etching with a 5% aqueous solution of hydrofluoric acid, a hologram forming sheet was obtained that had an aluminum layer formed only in the areas printed with the clear polyvinyl chloride ink.

Figure 10:
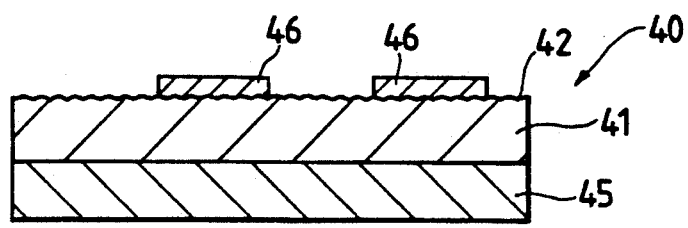
FIGS. 10 to 12 are cross-sectional views that show schematically the process of producing a hologram forming sheet according to yet another embodiment of the present invention.
Figure 11:
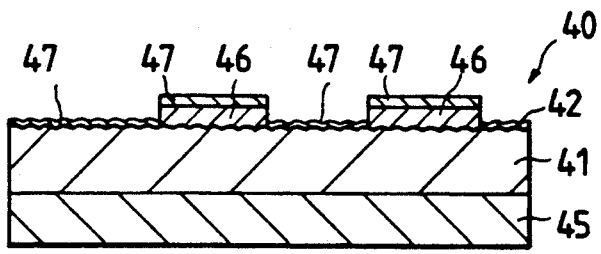

A fourth example of the hologram forming sheet of the present invention is described below with reference to FIGS. 10 to 12, which are cross-sectional views showing schematically the successive steps of producing the hologram forming sheet of the present invention. In FIG. 10, the hologram forming sheet 40 comprises a resin layer 41 that is formed on a substrate sheet 45 and that is provided with a hologram pattern forming surface 42, and an ink layer 46 formed in selected areas of the hologram pattern forming surface 42. As in the second example, the resin layer 41 is chiefly composed of a polypropylene resin having a Rockwell hardness of at least 70, and its thickness is preferably on the order of 5 to 100 μm.

The substrate sheet 45 may be formed on any suitable material such as a drawn polypropylene film, polycarbonate film, a polyester film or a Cellophane film. The thickness of the substrate sheet 45 is preferably on the order of 10 to 200 μm.

The resin layer 41 having the hologram pattern forming surface 42 can be provided on the substrate sheet 45 as in the second example using an extrusion laminator of the type shown in FIG. 6.

The areas in which the ink layer 46 is to be provided are properly determined considering which areas of the hologram pattern forming surface need be transparent depending upon the specific use of sheets or wrapping bags, or which areas are preferably not provided with the reflecting metal layer from an artistic design and other viewpoints. The ink layer 46 may be provided by any suitable technique such as gravure printing with a water-soluble ink. Water soluble inks to be used must resist the formation of the reflecting metal layer 47 in the subsequent step (to be described just below) and it is also required that they be readily washed away with water. An example of water-soluble inks that meet these requirements is "Sealite Primer" of Dainippon Ink & Chemicals, Inc. The ink layer 46 preferably has a thickness that is usually on the order of 1 to 3 μm.

The reflecting metal layer 47 is subsequently formed over the hologram pattern forming surface 42 and the ink layers 46 (see FIG. 11). This reflecting metal layer 47 may be provided by vacuum evaporation, sputtering, ion plating and other suitable treatments of a metal such as aluminum or a metal oxide such as zinc oxide. The reflecting metal layer 47 preferably has a thickness that is usually on the order of 20 to 70 nm.

Figure 12:
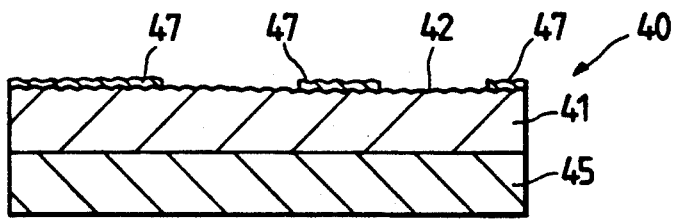

In the subsequent step, the ink layers 46 are washed away with water, causing the reflecting metal layer 47 on the ink layers 46 to be removed simultaneously, whereby both transparent regions and regions provided with the reflecting metal layer are formed on the hologram forming sheet 40 (see FIG. 12).

The formation of these transparent regions satisfies the requirement that some areas of the hologram pattern forming surface remain transparent depending the specific use of sheets or wrapping bags or that no reflecting metal layers should be provided in selected areas from an artistic design and other viewpoints.

The fourth example of the present invention is described below in greater detail with reference to the results of an experiment conducted in line with this example.

EXPERIMENT 3

Using an extrusion laminator of the type shown in FIG. 6, a polypropylene resin (see below) was extrusion-laminated over a substrate sheet (see below) under the conditions of extrusion specified below, whereby a hologram forming sheet was prepared. A hologram relief master plate prepared in the same way as in Experiment 1 was bonded to the peripheral surface of the chill roll by means of an adhesive.

Polypropylene resin: FW-163 of Union Polymer Co., Ltd. (Rockwell hardness = 100).

Substrate sheet: biaxially drawn polypropylene film (20 μm thick).

Conditions of extrusion:
L/D of screw = 24
cylinder temperature = 160° to C., 180° C., 240° C.
adapter temperature = 260° C.
T die temperature = 280° C.
thickness of laminate = 20 μm
temperature of chill roll = 23° C.

Using a water-soluble ink ("Sealite Primer" of Dainippon Ink & Chemicals, Inc.) gravure printing was made on selected areas of the hologram pattern forming surface of the hologram forming sheet, and thereafter, an aluminum layer was evaporated in a thickness of 50 nm across the hologram pattern forming surface. By subsequently washing away the water-soluble ink with water, a hologram forming sheet was obtained that had transparent regions formed only in the areas printed with said water-soluble ink.

Figure 13:
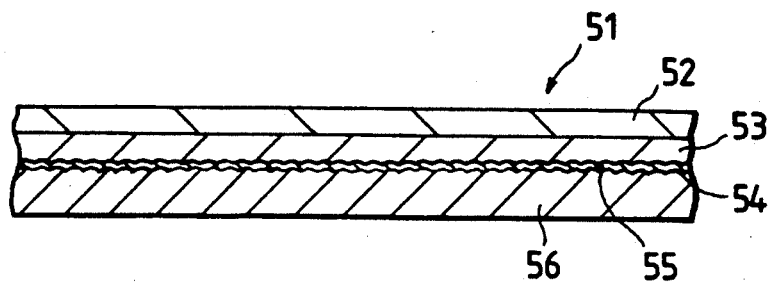
FIG. 13 is a cross-sectional view that shows schematically a hologram forming sheet according to a further embodiment of the present invention.

A fifth example of the hologram forming sheet of the present invention is described below with reference to FIGS. 13 to 17. FIG. 13 is a cross-sectional view showing schematically a hologram forming sheet according to still another embodiment of the present invention. The hologram forming sheet generally indicated by 51 in FIG. 13 comprises a heat-resistant resin layer 52 laminated over a resin layer 53, a hologram pattern forming surface 54 that is provided on the side of the resin layer 53 which is opposite to the side which is laminated with the heat-resistant resin layer 52, a reflecting metal layer 55 provided on the hologram pattern forming surface 54, and a sealant layer 56 provided on said reflecting metal layer 55.

The heat-resistanbbt resin layer 52 may be formed of any suitable material such as a biaxially drawn polypropylene film, a biaxially drawn polyethylene terephthalate film or a biaxially drawn nylon film. The constituent material and thickness of the heat-resistant resin layer 52 may be properly determined in accordance with the object of the specific use of the hologram forming sheet 51, with the thickness being usually on the order of 10 to 30 μm.

The resin layer 53 is chiefly composed of a polypropylene resin having a Rockwell hardness of at least 70 and may contain a nylon resin, a polycarbonate resin, a polyester resin, an ethylene/vinyl alcohol copolymer (EVOH), an acrylic resin, a vinyl chloride resin or some other resin as a minor component. The resin layer 53 is required to have a Vicat softening point (ASTM D1525) at least 10° C. higher than the melting point of the sealant layer 56 to be described below. This is in order to prevent the resin layer 53 from softening when two sealant layers are fused together with heat. The difference between the Vicat softening point of the resin layer 53 and the melting point of the sealant layer 56 is set to be at least 10° C. in consideration of the temperature variations that will normally occur in customary heat sealers. The thickness of the resin layer 53 may be properly determined in consideration of such factors as the laminatability with the heat-resistant resin layer 52 and the transparency of the resin layer 53. Usually, the resin layer 53 has a thickness on the order of 5 to 100 μm. If desired, an adhesive layer may be provided between the heat-resistant resin layer 52 and the resin layer 53.

The provision of the hologram pattern forming surface 54 on the side of the resin layer 53 opposite to the side where it is laminated with the heat-resistant layer 52 may be performed as in the second example using an extrusion laminator of the type shown in FIG. 6.

The reflecting metal layer 55 may be provided by vacuum evaporation, sputtering, ion plating or some other treatments of a metal such as aluminum or a metal oxide such as zinc oxide. The area where the reflecting metal layer 55 is provided may cover all or part of the hologram pattern forming surface 54 dependidng on the need. The reflecting metal layer 55 preferably has a thickness that is usually on the order of 20 to 70 nm.

Instead of the reflecting metal layer 55, a thin layer of a compound or a resin that preferably have a refractive index difference of at least 0.5 from the resin on which the hologram pattern is formed, say, a transparent compound such as zinc sulfide (ZnS) or antimony-trisulfide (Sb$_2$S$_3$) may be formed, and this enables the preparation of a hologram forming sheet that is transparent in itself but which is capable of efficient reproduction of a holographic image.

The sealant layer 56 may be provided either on the reflecting metal layer 55 or directly on the hologram pattern forming surface 54 in the areas where the reflecting metal layer 55 is not formed by a suitable method such as dry lamination of a resin such as a linear low-density polyethylene, medium-density polyethylene, ionomer, ethylene/vinyl acetate copolymer or polypropylene. Further, as already mentioned, the melting point of the sealant layer 56 is required to be lower than the Vicat softening point of the resin layer 53 by at least 10° C. The sealant layer 56 preferably has a thickness that is usually on the order of 10 to 80 μm.

Figure 14:
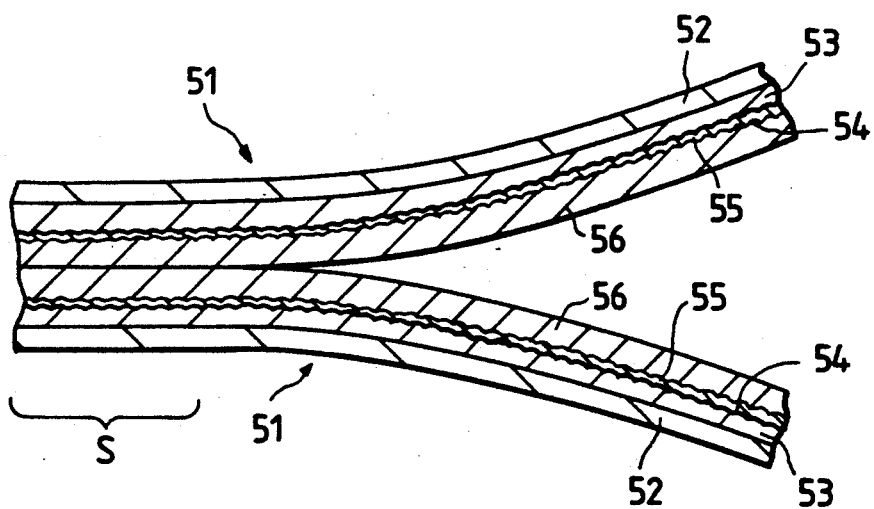
FIG. 14 is a cross-sectional view showing how two units of the hologram forming sheet shown in FIG. 13 are fused together by heat.

FIG. 14 is a cross-sectional view showing how the sealant layers 56 of two units of the hologram forming sheet 51 of the present invention are fused together with heat. As shown, the two sealant layers 56 are fused in the area S. This can be accomplished by various known heat-sealing techniques. If heat sealing is effected at a temperature slightly higher than the melting point of the sealant layers 56, they can be fused together completely without causing the resin layers 53 to soften. Thus, the hologram pattern forming surfaces 54 provided on the resin layers 53 will not be lost even if the sealant layers 56 are fused together with heat, and those surfaces will not blush on account of the softening or blushing of the resin layers 53.

Figure 15:
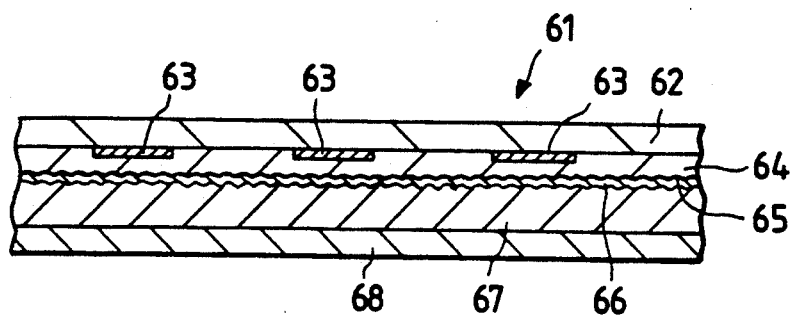
FIG. 15 is a cross-sectional view that shows schematically a hologram forming according to a still further embodiment of the present invention.

FIG. 15 is a cross-sectional view showing schematically a hologram forming sheet according to still another embodiment of the present invention. The hologram forming sheet generally indicated by 61 in FIG. 15 comprises a substrate sheet 62, an ink layer 63 provided in selected areas of the substrate sheet 62, a resin layer 64 provided on one side of the substrate sheet 62 in such a way as to cover the ink layers 63, a hologram pattern forming surface 65 provided on said resin layer 64, a reflecting metal layer 66 provided on the hologram pattern forming surface 65, an adhesive resin layer 67 and a sealant layer 68. The hologram forming sheet 61 can be prepared from the same materials as those used in the hologram forming sheet 51 by the same method except that it additionally has the ink layers 63 and the adhesive resin layer 67.

The ink layers 63 in the hologram forming sheet 61 are optional and can be formed by a known technique such as gravure printing. To provide improved printability, the surface of the substrate sheet 62 where the ink layers are to be provided may be subjected to a preliminary corona discharge treatment.

The adhesive resin layer 67 is preferably formed of an ethylenic copolymer, more preferably of an EMAA resin. An EMAA resin is a copolymer of ethylene and methacrylic acid and has such advantages as good adhesion to metals like aluminum and low hygroscopicity. For example, this adhesive resin layer 67 is formed of Nucrel (the tradename of Du Pont, U.S.A.) in a thickness of 20 μm.

Figure 16:
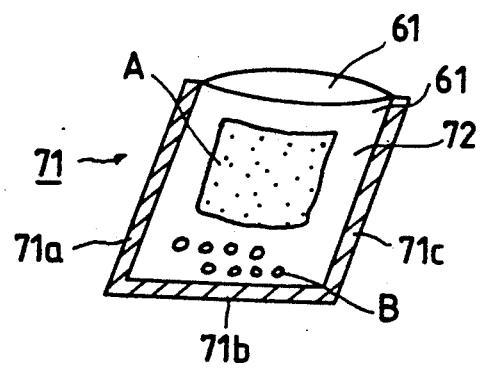
FIGS. 16 and 17 are perspective views of bags that are constructed using the hologram forming sheet shown in FIG. 15.
Figure 17:
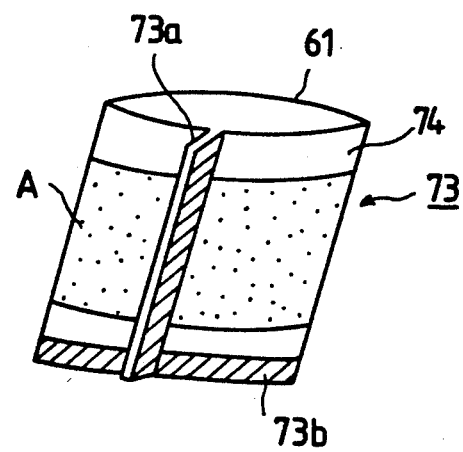

FIGS. 16 and 17 are perspective views of bags produced using the above-described hologram forming sheet 61. The bag generally indicated by 71 in FIG. 61 is composed of two hologram forming sheets 61 that are superposed in such a way that the sealant layers 68 face each other and which are heat-sealed along three sides 71a, 71b and 71c. A hologram pattern A and a printed display B appear on the front surface 72 of the bag 71.

The bag generally indicated by 73 in FIG. 17 is composed of a single hologram forming sheet 61 that is made tubular in such a way that the sealant layer 68 faces inward, and the opposite ends of the hologram forming sheet 61 are joined as if two hands are put flat together to provide seals 73a that are heat-sealed together with seals 73b at the lower end of the tube. A hologram pattern A appears on the surface 74 of the bag 73.

The fifth example of the present invention is described below in greater detail with reference to the results of an experiment conducted in line with this example.

EXPERIMENT 4

Using an extrusion laminator of the type shown in FIG. 6, a thermoplastic resin (see below) was laminated with a heat-resistant resin film (see below) under the conditions of extrusion specified below. A hologram relief master plate prepared by a process consisting of depositing another Ni plate on the stripped surface relief of a pressed master plate and then stripping the metallic Ni film was bonded to the peripheral surface of the chill roll by means of an adhesive.

Thermoplastic resin:
La 221 of Mitsui Petrochemical Industries, Ltd.;
Vicat softening point=150° C.;
density=0.91 g/cm$^3$;
melt flow rate (MFR)=23 g/10 min.

Heat-resistant resin film: biaxially drawn polypropylene film (25 μm thick)

Conditions of extrusion:
L/D of screw=24
cylinder temperature=160° C., 180° C., 240° C.
adapter temperature=260° C.
T die temperature=280° C.
thickness of laminate=15 μm
temperature of chill roll=23° C.

An aluminum layer was vacuum-evaporated in a thickness of 50 nm on the hologram pattern forming surface of the sheet prepared under the conditions set forth above. Thereafter, a sealant film (see below) was laminated over the aluminum layer by a suitable method such as dry lamination.

Sealant film: linear low-density polyethylene film ("Ultrazeks 2020L" of Mitsui Petorchemical industries, Ltd.)
melting point=120° C.;
density=0.92 g/cm$^3$;
melt flow rate (MRF)=2.1 g/10 min.

The thus prepared hologram forming sheet was heat-sealed under the conditions specified below to fabricate a wrapping bag.
temperature=130° C.
time=1 sec
pressure=3 kg/cm$^2$.

The hologram pattern in the heat-sealed area of this bag neigher disappeared nor blushed.

A comparative hologram forming sheet was prepared in the same way as described above except that the following thermoplastic resin was used.

Thermoplastic resin: "Ultrazeks 3520L" of Mitsui Petrochemical Industries, Ltd.
Vicat softening point=113° C.
density=0.935 g/cm$^3$
melt flow rate (MFR)=2.1 g/10 min.

A wrapping bag was fabricated by heat-sealing this comparative hologram forming sheet; the thermoplastic resin blushed in the heat-sealed area to cause partial loss of the hologram pattern.

Figure 18:
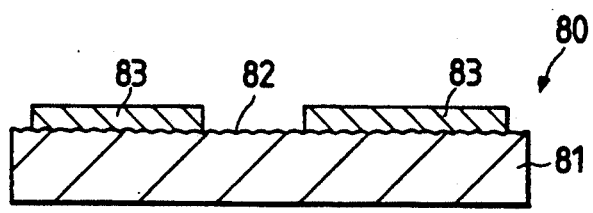
FIGS. 18 and 19 are cross-sectional views showing schematically the process of producing a hologram forming sheet according to another embodiment of the present invention.
Figure 19:
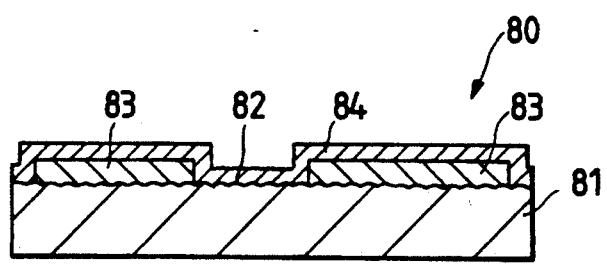

A sixth example of the hologram forming sheet of the present invention is described below with reference to FIGS. 18 to 21. FIGS. 18 and 19 are cross-sectional views showing schematically the successive steps of producing a hologram forming sheet according to an embodiment of the present invention. In FIG. 18, the hologram forming sheet generally indicated by 80 comprises a polypropylene resin sheet 81 having a hologram pattern forming surface 82, and ink layers 83 provided in selected areas of the hologram pattern forming surface 82.

As in the first example, the polypropylene resin sheet 81 is cheifly composed of a polypropylene resin having a Rockwell hardness (ASTM D785 Rockwell R scale) of at least 70. The thickness of this polypropylene resin sheet 81 is preferably on the order of 5 to 100 μm. The hologram pattern forming surface 82 can be provided on the polypropylene resin sheet 81 by either of the methods illustrated in FIGS. 2 and 3.

The areas in which the ink layer 83 is to be provided are properly determined from an artistic design and other viewpoints by considering which areas do not require the hologram pattern depending on the specific use of sheets or wrapping bags. The ink layer 83 may be provided by any suitable method such as gravure printing with ordinary gravure printing inks, which may be chromatic or achromatic. The ink layer 83 preferably have a thickness that is usually on the order of 1 to 5 μm.

In the next step, a reflecting metal layer 84 is provided on the hologram pattern forming surface 82 and the ink layers 83. This reflecting metal layer 84 may be provided by vacuum evaporation, sputtering, ion plating or some other suitable treatment of a metal such as aluminum or a metaloxide such as zinc oxide. The reflecting metal layer 84 preferably has a thickness that is usually on the order of 20 to 800 nm.

In the hologram forming sheet 81 described above, ink layers 83 are provided on the hologram pattern forming surface 82 by gravure printing or some other method. Since the thickness of the ink layers 83 is greater than the depth of recesses in the hologram pattern, those recesses are completely filled with the ink layers and the latter provides a flat surface despite the asperities in the hologram pattern, whereby the hologram pattern is lost in the areas where the ink layers 83 are provided. Further, the reflecting metal surface layer 84 is superposed on the hologram pattern forming surface 82 and the ink layer 83. As a result, the hologram forming sheet 81 provides a hologram pattern with metallic gloss only in the area of the hologram pattern forming surface 82 where no ink layers are provided.

Figure 20:
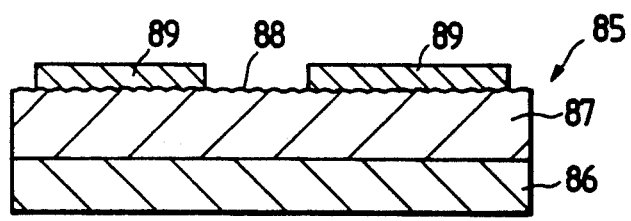
FIGS. 20 and 21 are cross-sectional views showing schematically the process of producing a hologram forming sheet according to still another embodiment of the present invention.
Figure 21:
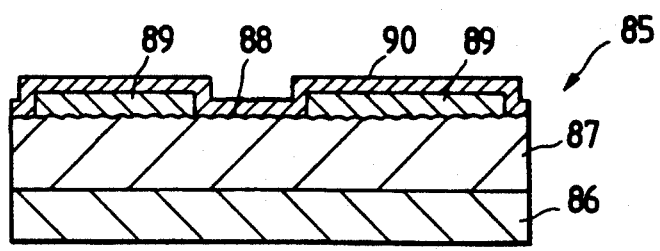

FIGS. 20 and 21 are cross-sectional views showing schematically the successive steps of producing a hologram forming sheet according to a further embodiment of the present invention. In FIG. 20, the hologram forming sheet generally indicated by 85 comprises a substrate sheet 86, a resin layer 87 that is provided on said substrate sheet 86 and which has a hologram pattern forming surface 88, and ink layers 89 that are provided in selected areas of the hologram pattern forming surface 88.

The substrate sheet 86 may be made of any suitable material such as a drawn polypropylene film, a polycarbonate film, a polyester film or a Cellophane film. The thickness of the substrate sheet 86 is preferably on the order of 10 to 200 μm. If desired, an anchor agent or an adhesive such as an acid-modified polyolefin may be coated on the side of the substrate sheet 86 where the resin layer 87 is provided.

The resin layer 87 is formed of a polypropylene resin having a Rockwell hardness (ASTM D785 Rockwell R scale) of at least 70, and its thickness is preferably on the order of 5 to 100 μm.

The resin layer 87 having the hologram pattern forming surface 88 can be provided on the substrate sheet 86 as in the second embodiment using an extrusion laminator of the type shown in FIG. 6.

The ink layers 89 and the reflecting metal layer 90 may be formed of the same materials as the already described ink layers 83 and reflecting metal layer 84 and they can be provided by the same methods.

The sixth example of the present invention is described below in greater detail with reference to the results of two experiments conducted in line with this example.

EXPERIMENT 5

Using an extrusion laminator of the type shown in FIG. 2, a polypropylene resin (see below) was extrusion-laminated under the conditions of extrusion specified below, whereby a hologram forming sheet was prepared. A hologram relief master plate prepared by a process consisting of depositing another Ni plate on the stripped surface relief of a pressed master plate and then stripping the metallic Ni film was bonded to the peripheral surface of the chill roll by means of an adhesive.

Polypropylene resin: LA-221 of Mitsui Petrochemical Industries, Ltd. (Rockwell hardness=75)

Conditions of extrusion:
L/D of screw=24
cylinder temperature=160° C., 180° C., 240° C.
adapter temperature=260° C.
T die temperature=280° C.
thickness of laminate=100 μm
temperature of chill roll=23° C.

Ink layers were provided in a thickness of 1 μm in selected areas of the hologram forming sheet by printing with a polyurethane resin gravure ink ("Lamic F220 White" of Dainichiseika Colour & Chemicals Mfg. Co., Ltd.) and thereafter, an aluminum layer was evaporated in a thickness of 50 nm over the ink layers and the hologram pattern forming surface. As a result, a hologram forming sheet was obtained that had a hologram pattern with metallic gloss formed only in the areas where no ink layers were provided.

EXPERIMENT 6

Using an extrusion laminator of the type shown in FIG. 6, a polypropylene resin (see below) was extrusion-laminated over a substrate sheet (see below) under the conditions of extrusion specified below, whereby a hologram forming sheet was prepared. A hologram relief master plate prepared in the same way as in Experiment 5 was bonded to the peripheral surface of the chill roll by means of an adhesive.

Polypropylene resin: LA-221 of Mitsui Petrochemical Industries, Ltd. (Rockwell hardness=95)

Substrate sheet: drawn polypropylene film (20 μm thick)

Conditions of extrusion:
L/D of screw=24 cylinder temperature=160° C., 180° C., 240° C.
adapter temperature=260° C.
T die temperature=280° C.
thickness of laminate=15 μm
temperature of chill roll=23° C.

An ink layer was provided in a thickness of 1 μm in selected areas of the hologram forming sheet in the same way as in Experiment 5. An aluminum layer was evaporated in a thickness of 50 nm over the ink layers and the hologram pattern forming surface. As a result, a hologram forming sheet was obtained that had a hologram pattern with metallic gloss formed only in the areas where no ink layers were provided.

Figure 22:
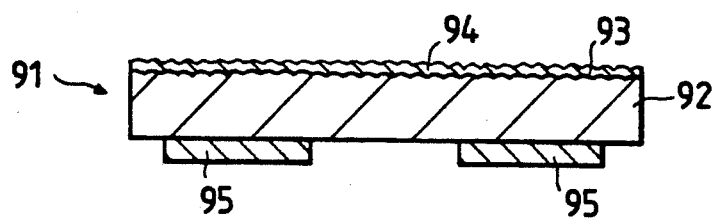
FIGS. 22 to 25 are cross-sectional views showing schematically hologram forming sheets according to further embodiments of the present invention.

A seventh example of the hologram forming sheet of the present invention is described below with reference to FIGS. 22 and 23. FIG. 22 is a cross-sectional view showing schematically a hologram forming sheet according to still another embodiment of the present invention. The hologram forming sheet generally indicated by 91 in FIG. 22 comprises a polypropylene resin sheet 92 having a hologram pattern forming surface 93, a reflecting metal layer 94 provided on the hologram pattern forming surface 93, and opaque ink layers 95 provided in selected areas of the back side of the polypropylene resin sheet 92.

As in the first embodiment, the polypropylene resin sheet 92 is composed of a polypropylene resin having a Rockwell hardness (ASTM D785 Rockwell R scale) of at least 70 and its thickness is preferably on the order of 5 to 100 μm. The hologram pattern forming surface 93 may be provided on the polypropylene resin sheet 92 as in the first embodiment using an extrusion laminator of the type shown in FIG. 2.

The reflecting metal layer 94 may be provided by vacuum evaporation, sputtering, ion plating or some other suitable treatments of a metal such as aluminum or a metal oxide such as zinc oxide. The reflecting metal layer 94 preferably has a thickness that is usually on the order of 20 to 70 nm. The reflecting metal layer 94 is preferably protected with a laminated film.

The areas in which the opaque ink layer 95 is to be provided are properly determined considering which areas should preferably have no hologram pattern with metallic gloss from an artistic design and other viewpoints. The opaque ink layers 95 may be provided by any suitable method such as gravure printing with ordinary opaque gravure printing inks. The opaque ink layers 95 preferably have a thickness that is usually on the order of 1 to 3 μm.

As described above, the reflecting metal layer 94 is superposed on the hologram pattern forming surface 93 of the hologram forming sheet 91 and this provides a hologram pattern with metallic gloss. Further, the opaque ink layers 95 are provided in selected areas of the back side of the polypropylenn resin sheet 92 and this insures that the hologram pattern with metlalic gloss is masked in the areas where the opaque ink layers 95 are provided. Consequently, if the hologram forming sheet 91 is observed from the side where the opaque ink layers 95 are provided, the viewer can see the hologram pattern with metallic gloss only in the areas of the hologram forming sheet 91 where no opaque ink layers are provided by gravure printing or other methods.

Figure 23:
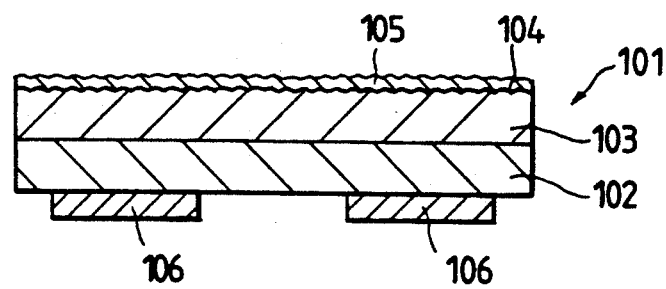

FIG. 23 is a cross-sectional view showing schematically a hologram forming sheet according to yet another embodiment of the present invention. The hologram forming sheet generally indicated by 101 in FIG. 23 comprises a substrate sheet 102, a resin layer 103 that is provided on said substrate sheet 102 and which has a hologram pattern forming surface 104, a reflecting metal layer 105 provided on the hologram pattern forming surface 104, and opaque ink layers 106 provided in selected areas of the back side of the substrate sheet 102.

The substrate sheet 102 may be formed of any one of the transparent films enumerated in the previous examples.

The resin layer 103 is formed of a polypropylene resin having a Rockwell hardness (ASTM D785 Rockwell R scale) of at least 70 and its thickness is preferably on the order of to 5-100 μm.

The resin layer 103 having the hologram pattern forming surface 104 may be provided on the substrate sheet 102 as in the second example using an extrusion laminator of the type shown in FIG. 6.

For the constituent materials of the reflecting metal layer 105 and the opaque ink layers 106, the methods of their formation, their thicknesses and any other relevant information, see the foregoing description of the reflecting metal layer 94 and the opaque ink layers 95.

The seventh example of the present invention is described below in greater detail with reference to the results of two experiments conducted in line with this example.

EXPERIMENT 7

Using an extrusion laminator of the type shown in FIG. 2, a polypropylene resin (see below) was extrusion-laminated under the conditions of extrusion specified below, whereby a hologram forming sheet was prepared. A plurality of hologram relief master plates each prepared by a process consisting of depositing another Ni plate on the stripped surface relief of a pressed master plate and then stripping the metallic Ni film were bonded to the peripheral surface of the chill roll by means of an adhesive.

Polypropylene resin: LA-221 of Mitsui Petrochemical Industries, Ltd. (Rockwell hardness=95)
Conditions of extrusion:
L/D of screw=24
cylinder temperature=160° C., 180° C., 240° C.
adapter temperature=260° C.
T die temperature=280° C.
thickness of laminate=100 μm
temperature of chill roll=23° C.

An aluminum layer was evaporated in a thickness of 30 nm on the hologram pattern forming surface of the hologram forming sheet, which was subsequently joined with a low-density polyethylene film 40 μm thick by dry lamination. Thereafter, using a gravure printing ink ("Panamia SL-PR" of Dainippon Ink & Chemicals, Inc.), gravure printing was made on the back side of the hologram forming sheet which was opposite the hologram pattern forming surface. The hologram patterns were masked in the areas where gravure printing was performed and they were observed only in the areas where no gravure printing was made. As a result, the boundaries and other discontinuities between adjacent hologram patterns could be effectively hidden.

EXPERIMENT 8

Using an extrusion laminator of the type shown in FIG. 6, a polypropylene resin (see below) was extrusion-laminated over a substrate sheet (see below) under the conditions of extrusion specified below, whereby a hologram forming sheet was prepared. A plurality of hologram relief master plates prepared in the same way as in Experiment 7 were bonded to the peripheral surface of the chill roll by means of an adhesive.

Polypropylene resin: LA-221 of Mitsui Petrochemical Industries, Ltd. (Rockwell hardness=95)

Substrate sheet: biaxially drawn polypropylene film (20 μm thick)

Conditions of extrusion:
L/D of screw=24
cylinder temperature=160° C., 180° C., 240° C.
adapter temperature=260° C.
T die temperature=280° C.
thickness of laminate=30 μm
temperature of chill roll=23° C.

An aluminum layer was evaporated in a thickness of 30 nm on the hologram pattern forming surface of the hologram forming sheet, which was subsequently joined with a low-density polyethylene film 40 μm thick by dry lamination. Thereafter, using a gravure printing ink ("Panamia SL-PR" of Dainippon Ink & Chemicals, Inc.), gravure printing was made on the biaxially drawn polypropylene film. The hologram patterns were masked in the areas where gravure printing was performed and they were observed only in the areas where no gravure printing was made. As a result, the boundaries and other discontinuities between adjacent hologram patterns could be effectively hidden.

Figure 24:
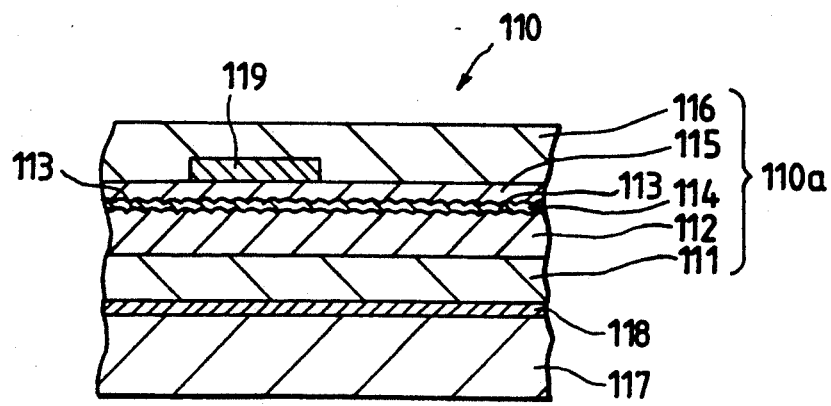

An eighth example of the hologram forming sheet of the present invention is described below with reference to FIGS. 24 to 28. FIG. 24 is a cross-sectional view showing schematically a hologram forming sheet according to a still further embodiment of the present invention. The hologram forming sheet generally indicated by 110 in FIG. 24 comprises: a laminated sheet 110a consisting of a substrate sheet 111, a resin layer 112 that is provided on said substrate sheet 111 and which has a hologram pattern forming surface 113, a reflecting metal layer 114 provided on the hologram pattern forming surface 113, and a protective layer (OP varnish layer) 116 superposed on the reflecting metal layer 114 via a primer layer 115, and a sheet of paper 117 that is provided on the back side of the substrate sheet 111 in the laminated sheet 110a via an adhesive layer 118. The substrate sheet 111 is formed of a drawn polypropylene resin. The resin layer 112 is formed of a polypropylene resin having a Rockwell hardness (ASTM D785 Rockwell R scale) of at least 70. The resin layer 112 having the hologram pattern forming surface 113 may be provided on the substrate sheet 111 as in the second example using an extrusion laminator of the type shown in FIG. 6. The thickness of the resin layer 112 is preferably on the order of 5 to 100 μm.

The reflecting metal layer 114 may be a film of metal such as aluminum that is provided by a known technique such as vacuum evaporation. The provision of this reflecting metal layer 114 contributes to the formation of a hologram or diffraction grating relief having metallic gloss. When the reflecting metal layer 114 is formed by vacuum evaporation, the sheet of paper 117 is yet to be provided in the hologram forming sheet 110 and, hence, the reflecting metal layer formed has satisfactory performance without being affected by water evaporation from the sheet of paper.

Instead of the metal reflecting layer 114, a thin layer of a compound or a resin that preferably have a refractive index difference of at least 0.4 from the resin layer on which the hologram pattern is formed, say, a transparent compound such as zinc sulfide (ZnS) or antimony-trisulfide ($Sb_2S_3$) may be formed, and this enables a desired holographic image to be reproduced in an efficient way.

The primer layer 115 is provided to insure better adhesion between the reflecting metal layer 114 and the protective layer (OP varnish layer) 116 and may be formed of various lacquers.

The protective layer (OP varnish layer) 116 may be provided by coating and any other suitable methods. If desired, it may be formed by dry laminating a transparent film in the manner already described above. The protective layer 116 is usually made of a cellulosic material but if printing or other processing is to be done on the surface of the protective layer 116, it may be formed of a poly (vinyl chloride-co-vinyl acetate) material.

If desired, ink layers 119 may be provided on the surface of the primer layer 115 as shown in FIG. 24. Alternatively, the ink layers 119 may be provided on the protective layer 116.

The sheet of paper 117 may be formed of any kinds of paper including wood-free paper, medium-quality paper, gravure paper, art paper, coated paper and synthetic paper. The thickness and basis weight ($g/m^2$) of the sheet can be properly determined in accordance with such factors as the thickness and stiffness required for the specific object depending upon whether the hologram forming sheet is used as wrapping materials, cartons or in other applications.

The sheet of paper 117 may be bonded to the back side of the substrate sheet 111 in the laminated sheet 110a using an adhesive such as a polyurethane resin adhesive.

Figure 25:
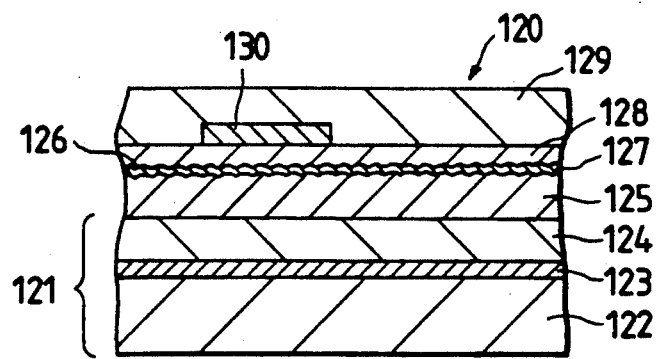

FIG. 25 is a cross-sectional view showing schematically a hologram forming sheet according to yet another embodiment of the present invention. The hologram forming sheet generally indicated by 120 in FIG. 25 comprises: a composite substrate sheet 121; a resin layer 125 extrusion-laminated over said composite substrate sheet 121; a hologram pattern forming surface 126 covering all or part of the top of the resin layer 125; a reflecting metal layer 127 provided on the hologram pattern forming surface 126; and a protective layer (OP varnish layer) 129 provided over said reflecting metal layer 127 via a primer layer 128. The composite substrate sheet 121 is a combination of a first sheet 122, an adhesive layer 123 and a second sheet 124 that is laminated with the first sheet 122 by means of said adhesive layer 123. In the example shown in FIG. 25, a printed layer 130 may be provided on the primer layer 128. If desired, the printed layer 130 may be provided on the protective layer 129.

Each of the first and second sheets 122 and 124 may be formed of a sheet of paper such as wood-free paper, medium-quality paper, gravure paper, art paper or coated paper. The thickness and basis weight ($g/m^2$) of each sheet can be properly determined in accordance with such factors as the thickness and stiffness required for the specific object depending upon whether the hologram forming sheet is to be used as wrapping materials, cartons or in other applications. The first sheet 122 is usually thicker than the second sheet 124. The second sheet 124 may be formed of a drawn polypropylene resin. The use of the composite substrate sheet 121 offers the advantage that when the reflecting metal layer 127 is formed by vacuum evaporation, the amount of water coming out of the composite substrate sheet during vacuum drawing can be reduced.

The resin layer 125 having the hologram pattern forming surface 126 may be provided on the composite substrate sheet 121 as in the second example using an extrusion laminator of the type shown in FIG. 6. The resin layer 125 is made of a polypropylene resin having a Rockwell hardness (ASTM D785 Rockwell R scale) of at least 70 and its thickness is preferably on the order of 5 to 100 μm.

The reflection metal layer 127, primer layer 128 and protective layer 129 are formed of the same materials as those used in the example shown in FIG. 24.

Figure 26:
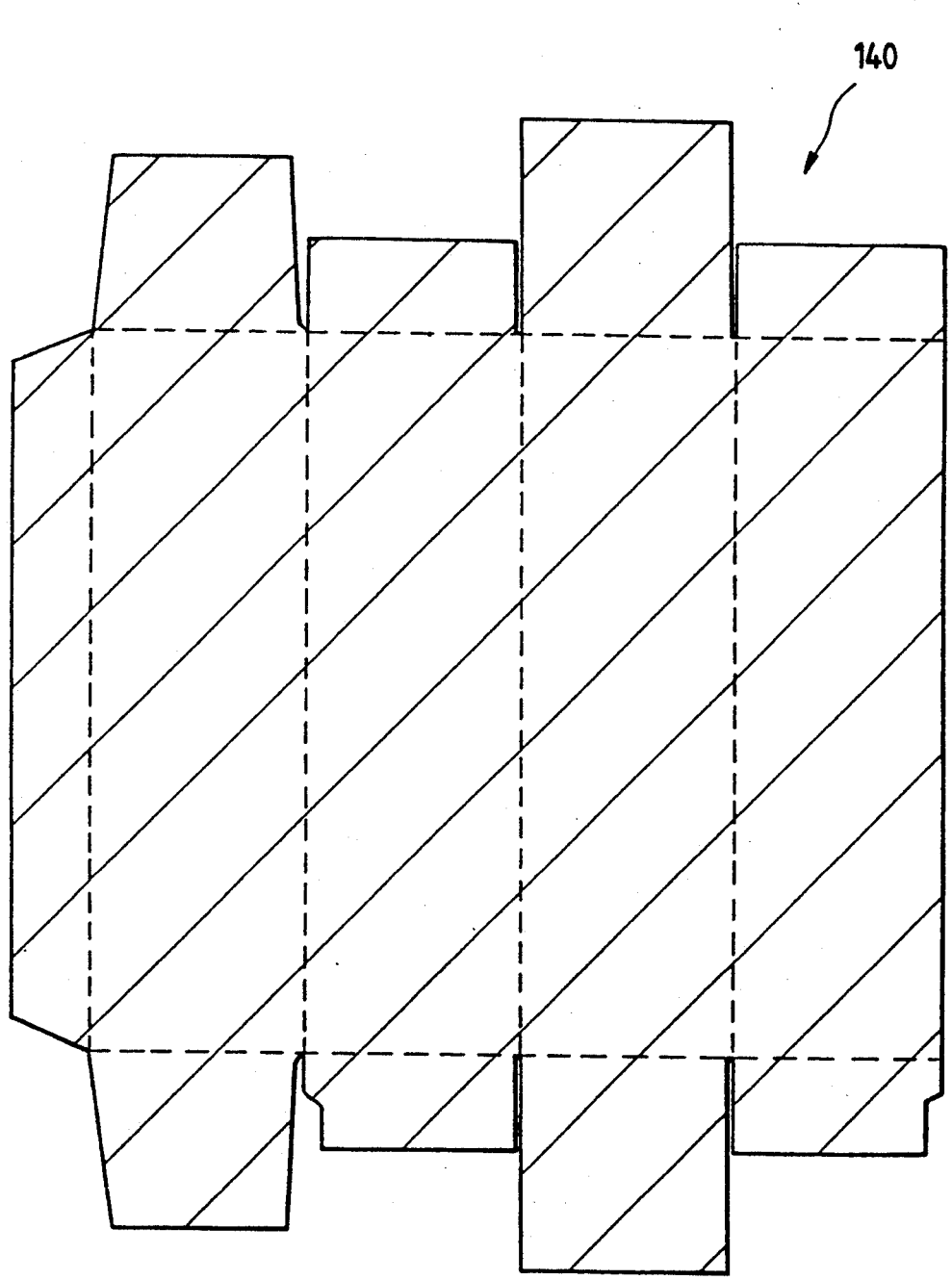
FIG. 26 is a plan view of a container blank that is made of the hologram forming sheet of the present invention.

FIG. 26 is a plan view of a container blank that is made of the hologram forming sheet of the present invention. The blank generally indicated by 140 in FIG. 26 is prepared by punching out the hologram forming sheet, optionally after bonding its composite substrate sheet side or paper sheet side to a paperboard (basis weight ≧ 200 g/m$^2$). The entire surface of the blank 140 is covered with the hologram pattern forming surface (as indicated by hatching). A container with a hologram can be constructed by folding the blank 140 in such a way that the individual fold lines (indicated by dashed lines in FIG. 25) will protrude. The thus constructed container has the hologram pattern forming surface clearly visible since it is provided as an integral part of the entire outer surface of the container.

Figure 27:
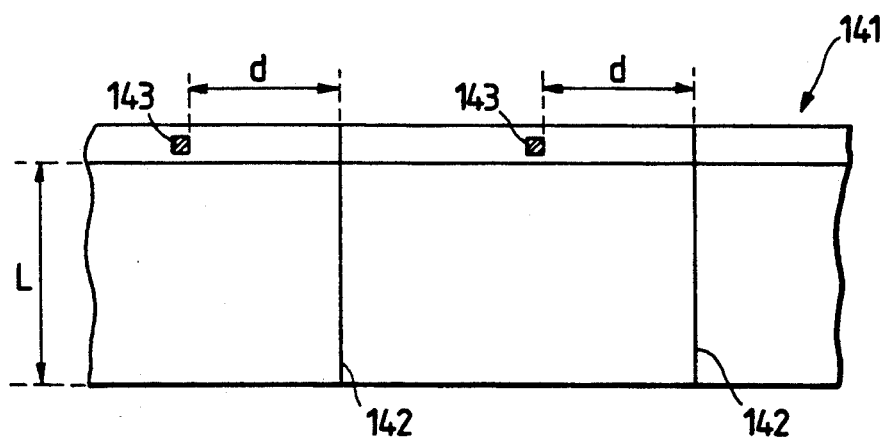
FIG. 27 is a plan view of the hologram forming sheet of the present invention with register marks provided along the edge.
Figure 28:
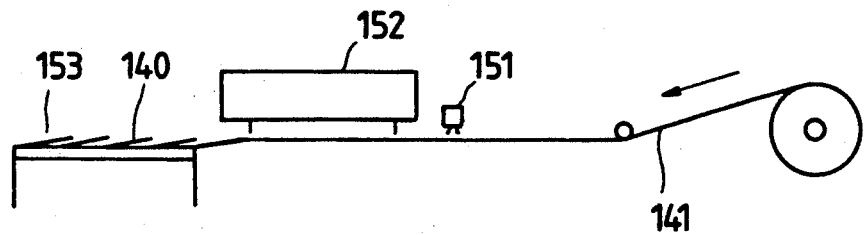
FIG. 28 is a diagram illustrating how the hologram forming sheet shown in FIG. 27 is punched to make a blank.

The method by which the blank shown in FIG. 26 is punched from the hologram forming sheet of the present invention is described below with reference to FIG. 27. The hologram forming sheet is usually preapred with a plurality of hologram relief master plates mounted on the peripheral surface of the chill roll 14 as shown in FIG. 6. Hence, the hologram forming sheet (indicated by 141 in FIG. 27) as it is taken up by the winder 16 has seams or boundaries 142 between adjacent master plates that occur at regular intervals as shown in FIG. 27. Usually, these seams 142 are hardly noticeable since the adjacent master plates are positioned very close to each another. Therefore, the hologram forming sheet 141 may safely be punched out without considering the seams 142. However, if desired, punching may be performed in such a way as to avoid the seams 142. In this case, a register mark 143 is provided at a position a predetermined distance d away from each of the seams 142 beyond the effective width of hologram L on the hologram forming sheet 141 being produced, and the completed hologram forming sheet is punched out with these resister marks 143 used for indexation. This can be done as shown in FIG. 28; first, the hologram forming sheet 141 is unwound from the winder by means of a transport means (not shown in the direction indicated by the arrow until the register mark 143 is detected with a sensor 151 that has a certain preset positional relationship with a punching unit 152; then, the sheet 141 is further fed a certain distance so that the seam 142 will not be located beneath the punching unit 152 and the transport means is stopped; finally, the hologram forming sheet is punched with the punching unit 152 to make a blank. This procedure is repeated to punch out a plurality of blanks 140 which are successively sent to a stacker 153.

The eighth example of the present invention is described below in greater detail with reference to the results of two experiments conducted in line with this example.

EXPERIMENT 9

Using an extrusion laminator of the type shown in FIG. 6, a polypropylene resin (see below) was extrusion-laminated over a substrate sheet (see below) under the conditions of extrusion specified below, whereby a unitary assembly of the substract sheet 111 and the resin layer 112 (see FIG. 24) was prepared as part of the laminated sheet 110a.

Substrate sheet: drawn polypropylene film (20 μm thick)

Polypropylene resin: LA-221 of Mitsui Petrochemical Industries, Ltd. (Rockwell hardness = 95)

Conditions of extrusion: cylinder temperature = 270° C., 270° C., 270° C.

adapter temperature = 290° C.

T die temperature = 290° C.

thickness of laminate = 30 μm.

The resulting unitary assembly had a clearly visible hologram pattern.

The polypropylene resin layer in the thus prepared hologram forming sheet having a hologram pattern forming surface was subjected to a corona discharge treatment to attain a wetness index of at least 42 dynes. Thereafter, an aluminum layer was deposited on the polypropylene resin layer by vacuum evaporation, and a protective layer (OP varnish layer) was provided on the evaporated aluminum layer with a primer layer interposed.

Subsequently, a sheet of paper 117 (see below) was bonded to the back side of the laminated sheet by dry lamination.

Sheet of paper: wood-free paper (basis weight = 200 g/m$^2$).

A hologram pattern of metallic gloss was clearly visible on the thus prepared hologram forming sheet.

EXPERIMENT 10

Using an extrusion laminator of the type shown in FIG. 6, a resin (see below) was extrusion-laminated over a composite substrate sheet (see below) under the conditions of extrusion specified below, whereby a hologram forming sheet was prepared that had the construction shown in FIG. 25.

Composite substrate sheet: wood-free paper (basis weight = 200 g/m$^2$ used to make the first sheet 122; wood-free paper (basis weight = 80 g/m$^2$) used to make the second sheet 124

Resin: polypropylene, LA-221 of Mitsui Petrochemical Industries, Ltd. (Rockwell hardness = 95)

Conditions of extrusion:

cylinder temperature = 270° C., 270° C., 270° C.

adapter temperature = 290° C.

T die temperature = 290° C.

thickness of laminate = 30 μm

The second sheet 124 made of the wood-free paper having a basis weight of 80 g/m$^2$ was subjected to a corona discharge treatment in order to improve the adhesion of the side which was to be laminated with the polypropylene resin layer.

The polypropylene resin layer in the thus prepared hologram forming sheet having a hologram pattern forming surface was subjected to a corona discharge treatment to attain a wetness index of at least 42 dynes. Thereafter, an aluminum layer was deposited on the polypropylene layer by vacuum evaporation, and a protective layer (OP varnish layer) was provided on the evaporated aluminum layer with a primer layer interposed.

A hologram pattern of metallic gloss was clearly visible on the thus prepared hologram forming sheet.

A ninth example of the hologram forming sheet of the present invention is described below with reference to FIGS. 29 to 36.

Figure 29:
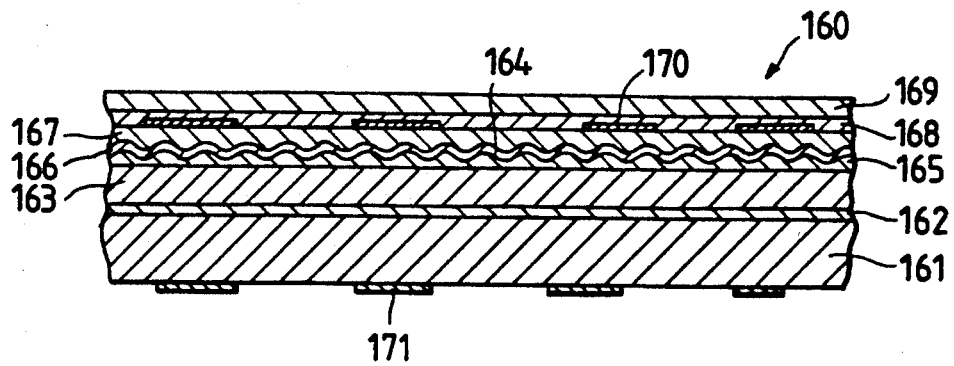
FIG. 29 is a cross-sectional view showing schematically a hologram forming sheet according to yet another embodiment of the present invention.

FIG. 29 is a cross-sectional view of a hologram forming sheet according to another embodiment of the present invention. The hologram forming sheet generally indicated by 160 in FIG. 29 comprises, in order from the bottom to top, the following layers: a release paper 161, a tackifier layer 162, a substrate sheet 163, a resin layer 165 having a hologram pattern forming surface 164, a reflecting metal layer 166, a primer layer 167, an adhesive layer 168, and a protective layer 169.

Printing ink layers 170 and 171 are provided on the surfaces of the primer layer 167 and the release paper 161, respectively. These printing ink layers are optional. Printing ink layers 170 may be provided on the surface of the protective layer 169 rather than the primer layer 167.

The release paper 161 is made of paper having a basis weight of 100 g/m$^2$ and which has silicone coated on the side facing the tackifier layer 162. The other side of the release paper 161 is provided with a display such as a pattern or picture that is formed of printing ink layers 171 by conventional printing techniques.

In one example, the tackifier layer 162 may be formed by applying a polyacrylic resin tackifier (BPS-3841 of Toyo Ink Mfg. Co., Ltd. mixed with a curing agent BPS-3841B at a ratio of 50:1) in a weight of 20 g/m$^2$. The thickness of the tackifier layer 162 is preferably in the range of 5 to 50 g/m$^2$ in terms of coating weight.

The substrate sheet 163 is formed of a biaxially drawn polypropylene resin film in a thickness of 60 μm. While the substrate sheet 163 is typically in the form of a polypropylene resin film, it may be made of any other transparent materials including a polycarbonate resin film, a polyester resin film, a Cellophane film, etc. The thickness of the substrate sheet 163 is preferably on the order of 10 to 200 μm.

The resin layer 165 having the hologram pattern forming surface 164 is formed by extrusion coating of a polypropylene resin having a Rockwell hardness (ASTM D785 Rockwell R scale) of at least 70, which may be exemplified by LA-221 of Mitsu Petrochemical Industries, Ltd. While this resin layer 165 is typically made of a polypropylene resin, it may be formed of any other transparent resins including a polyester resin, a polyamide resin, a polycarbonate resin, an ethylene/vinyl alcohol copolymer, etc. These remains preferably contain those additives which will not gasify during the formation of the reflecting metal layer to be described below. The resin layer 165 desirably has a thickness of 5 TO 100 μm.

The reflecting metal layer 166, primer layer 167 and protective layer 169 may be formed of the same materials as those used in the eighth example.

The adhesive layer 168 is formed by applying a polyurethane resin adhesive ("Takerac A-385" of Takeda Chemical Industries, Ltd.) in a coating weight of 3 g/m$^2$. The adhesive may be pressure-sensitive, heat-sensitive, hot-melt type, or one- or two-part cold-setting type.

Figure 30:
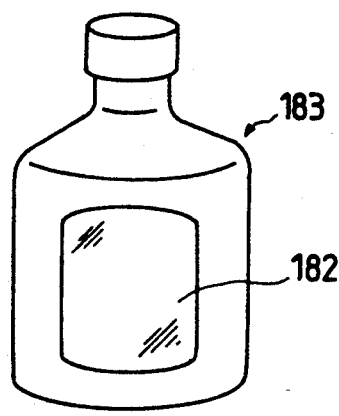
FIG. 30 is a perspective view of a bottle with a label attached that is made of the hologram forming sheet of the present invention.
Figure 31:
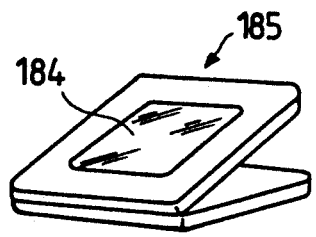
FIG. 31 is a perspective view of a container with a label attached that is made of the hologram forming sheet of the present invention.
Figure 32:
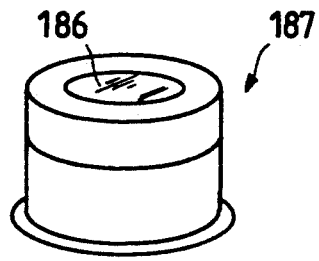
FIG. 32 is a perspective view of a cylindrical container with a label attached that is made of the hologram forming sheet of the present invention.

The hologram forming sheet 160 having the construction described above is punched out to make a blank which is slit or otherwise processed to produce a label in a desired form such as a rectangle, square, circle or strip depending on the object of use. While this label can be used not only as a toy seal but also as a decorative seal, several examples of its application are described below with reference to FIGS. 30 to 36. In FIG. 30, a label 182 with a suitable curved contour is attached to the lateral side of a blow-molded container 183; in FIG. 31, a rectangular or square label 184 is attached to the lid of an injection-molded, freely openable container 185; in FIG. 32, a circular label 186 is attached to the lid of an injection-molded container 187; in FIG. 33, strip labels 188$a$ and 188$b$ are attached to the lid and body, respectively, of a box-type container 189; in FIG. 34, a square label 190 with the four corners cut off is attached to the lid of a box-type container 191; in FIG. 35, a circular label 192 is attached to the entire part of the top face of an injection-molded pin 193; and in FIG. 36, a strip label 194 is attached in such a way as to encircle a carton 195 as a container.

Figure 33:
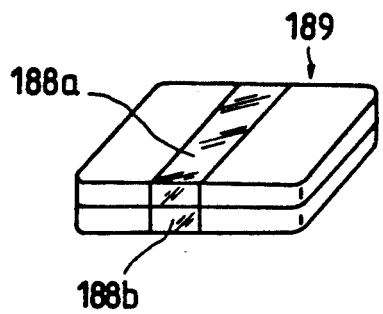
FIG. 33 is a perspective view of a container with a label in strip form attached as a seal that is made of the hologram forming sheet of the present invention.
Figure 34:
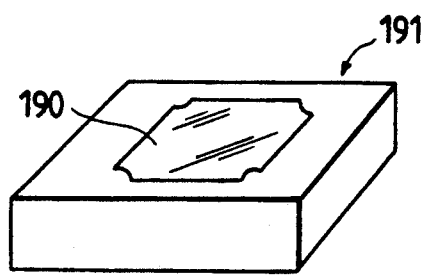
FIG. 34 is a perspective view of a box with a rectangular label attached that is made of the hologram forming sheet of the present invention.
Figure 35:
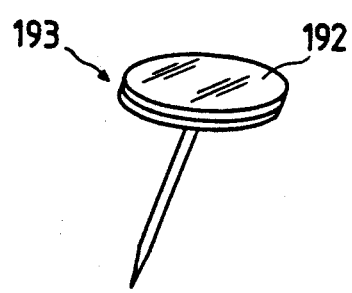
FIG. 35 is a perspective view of a pin with a circular label attached that is made of the hologram forming sheet of the present invention.
Figure 36:
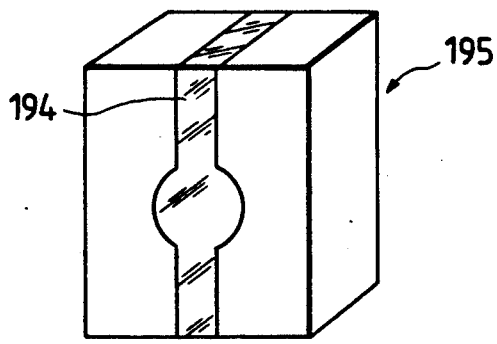
FIG. 36 is a perspective view of a box with a label in strip form attached as a seal that is made of the hologram forming sheet of the present invention.

Labels 188$a$ and 188$b$ shown in FIG. 33, as well as the label 194 shown in FIG. 36 may be completely wound around the container so that they will also serve as a seal.

In the first to ninth examples of the present invention described on the foregoing pages, a polypropylene resin having a Rockwell hardness of at least 70 is used but equally good results will be attained if said polypropylene resin is replaced by an amorphous polymer in which part of the glycol component of polyethylene terephthalate is substituted by 1,4-cyclohexanedimethanol. This amorphous polymer is a copolyester prepared by copolymerizing terephthalic acid (acid component) with ethylene glycol and 1,4-cyclohexanedimethanol (alcohol components). The use of this amorphous polymer is based on the finding that the rate of crystallization can be controlled easily if part of the ethylene glycol component is substituted by 1,4-cyclohexanedimethanol. In the case where conventional polyethylene terephthalate is used, the extruded sheet must be quenched by a chill roll so that the polymer is rendered amorphous to impart high degree of transparency to the sheet. If, on the other hand, part of the ethylene glycol component is substituted by 1,4-cyclohexanedimethanol, the rate of crystallization can be sufficiently slowed down to obviate the need for quenching. Hence, the temperature of the chill roll can be set at a comparatively high level and yet a hologram pattern of better quality can be produced. Further, the amorphous polymer described above has the added advantage of high transparency, good adaptability for vacuum evaporation of metals, high glass transition point and strong stiffness, and this insures the formation of a highly visible and long keeping hologram pattern. The amorphous polymer to be used in the present invention preferably does not contain any additive that will gasify during the already-described step of forming reflecting metal layer.

Examples of the case where the amorphous polymer described above is used in place of the polypropylene resin having a Rockwell hardness of at least 70 are described below with reference to the results of experimental runs conducted in line with this case.

EXPERIMENT 11

(1) Using an extrusion laminator of the type shown in FIG. 6, an amorphous polymer (see below) was extrusion-laminated over a substrate sheet (see below) under the conditions of extrusion specified below, whereby a hologram forming sheet was prepared. An aluminum layer was vacuum evaporated on the hologram pattern forming surface of this sheet. The resulting sheet was designated sample 11-1.

Amorphous polymer: PET-G 6763 of Eastman Chemical Corp.

Substrate sheet: polyethylene terephthalate (25 μm thick)

Conditions of extrusion:
L/D of screw = 24
cylinder temperature = 240° C., 260° C., 280° C.
adapter temperature = 290° C.
T die temperature = 290° C.
thickness of laminate = 10 μm
temperature of chill roll = 80° C.
die gap width = 2 mm.

(2) Using an extrusion laminator of the type shown in FIG. 6, an amorphous polymer (see below) was extrusion-laminated over a substrate sheet (see below) having a preformed acid-modified polyolefin adhesive layer under the conditions of extrusion specified below, whereby a hologram forming sheet was prepared. An lauminum alyer was vacuum-evaporated on the hologram pattern forming surface of this sheet. The resulting sheet was designated sample 11-2.

Amorphous polymer: PET-G 6763 of Eastman Chemical Corp.

Substrate sheet: polyethylene terephthalate (25 μm thick)

Acid-modified polyolefin adhesive: "Adomer" resin of Mitsu Petrochemical Industries, Ltd. (coated in a thickness of 15 μm)

Conditions of extrusion:
L/D of screw = 24
cylinder temperature = 240° C., 260° C., 280° C.
adapter temperature = 290° C.
T die temperature = 290° C.
thickness of laminate = 10 μm
temperature of chill roll = 80° C.
die gap width = 2 mm.

(3) Using an extrusion laminator of the type shown in FIG. 2, an amorphous polymer (see below) was extrusion-laminated under the conditions of extrusion specified below, whereby a hologram forming sheet was prepared. An aluminum layer was vacuum evaporated on the hologram pattern forming surface of this sheet. The resulting sheet was designated sample 11-3.

Amorphous polymer: PET-G 6763 of Eastman Chemical Corp. Conditions of extrusion:
L/D of screw = 24
cylinder temperature = 240° C., 260° C., 280° C.
adapter temperature = 280° C.
T die temperature = 280° C.
thickness of laminate = 100 μm
temperature of chill roll = 23° C.

(4) A comparative hologram forming sheet was prepared by repeating the procedure for the preparation of sample 11-1 except that the polyethylene terephthalate shown below was used as the resin to be extruded. The sheet was designated as comparative sample 11-1.

Polyethylene terephthalate: PET 6857 of Eastman Chemical Corp.

(5) Using an extrusion laminator of the type shown in FIG. 6, a low-density polyethylene (see below) was extrusion-laminated over a substrate sheet (see below) under the conditions of extrusion specified below, whereby a hologram forming sheet was prepared. An aluminum layer was vacuum evaporated on the hologram pattern forming surface of this sheet. The resulting sheet was designated as comparative sample 11-2.

Low-density polyethylene: M-16 P of Mitsui Petrochemical Industries, Ltd.

Substrate sheet: polyethylene terephthalate (25 μm thick)

Conditions of extrusion:
L/D of screw = 24
cylinder temperature = 140° C., 180° C., 220° C.
adapter temperature = 280° C.
T die temperature = 290° C.
thickness of laminate = 10 μm
temperature of chill roll = 23° C.

The evaporated aluminum layer had a thickness of 50 nm.

A highly visible hologram pattern was formed in samples 11-1 to 11-3. However, the hologram pattern formed in comparative sample 11-1 was not highly visible on account of the haze in the extruded resin.

Samples 11-1 to 11-3 and comparative samples 11-1 and 11-2 were subjected to a peel test under the conditions specified below in order to evaluate the adhesion of the evaporated aluminum layer to the resin surface on which the hologram patterns were formed.

Peel test

An adhesive tape ("Cellotape" of Nichiban Co., Ltd.) having a width of 25 mm was attached to the aluminum layer in each sample and, 30 min. later, the tape was quickly pulled off by hand. The results as observed visually were as follows: samples 11-1 to 11-3 had good adhesion between the resin surface and the aluminum layer, but the aluminum layer in comparative sample 11-2 separated very easily.

Further, in order to evaluate their keeping quality, samples 11-1 to 11-3 and comparative sample 11-2 were left to stand at 60° C. for 1 month. No change was observed in the hologram patterns in samples 11-1 to 11-3 but the hologram pattern in comparative sample 11-2 became darker and its gloss decreased with time.

These results obviously show the effectiveness of the present invention.

In the first to ninth examples of the present invention, the polypropylene resin having a Rockwell hardness of at least 70 may also be replaced by an ethylene/vinyl alcohol copolymer resin, preferably one having an ethylene content of no more than 47 mol %. The use of these ethylene/vinyl alcohol copolymer resins is also within the scope of the present invention since having the advantage of high transparency, good adaptability for vacuum evaporation of metals, high glass transition temperature and strong stiffness, these resins will insure the formation of a highly visible and long keeping hologram pattern. If the ethylene content of these resins exceeds 47 mol %, the desired characteristics of the resins described above cannot be attained. The ethylene/vinyl alcohol copolymer resins to be used in the present invention preferably do not contain any additive that will gasify during the already-described step of forming a reflecting metal layer.

Examples of the case where the ethylene/vinyl alcohol copolymer resin described above is used in place of the polypropylene resin having a Rockwell hardness of at least 70 are described below with reference to the results of experimental runs conducted in line with this case.

EXPERIMENT 12

(1) Using an extrusion laminator of the type shown in FIG. 6, an ethylene/vinyl alcohol copolymer resin (see below) was extrusion-laminated over a substrate sheet (see below) under the conditions of extrusion specified below, whereby a hologram forming sheet was prepared. An aluminum layer was vacuum-evaporated on the hologram pattern forming surface of this sheet. The resulting sheet was designated sample 12-1.

Ethylene/vinyl alcohol copolymer resin: "Soanol E3808" of Nippon Synthetic Chemical Industry Co., Ltd. (ethylene content=38 mol %)

Substrate sheet: biaxially drawn polyester film (25 μm thick)

Conditions of extrusion:
L/D of screw=24
cylinder temperature=180° C., 200° C., 220° C.
adapter temperature=220° C.
T die temperature=220° C.
thickness of laminate=15 μm
temperature of chill roll=40° C.
die gap width=3 mm.

(2) Using an extrusion laminator of the type shown in FIG. 6, an ethylene/vinyl alcohol copolymer resin (see below) was extrusion-laminated over a substrate sheet (see below) having a preformed acid-modified polyolefin adhesive layer under the conditions of extrusion specified below, whereby a hologram forming sheet was prepared. An aluminum layer was vacuum-evaporated on the hologram pattern forming surface of this sheet. The resulting sheet was designated sample 12-2.

Ethylene/vinyl alcohol copolymer resin: "Soanol E3808" of Nippon Synthetic Chemical Industry Co., Ltd. (ethylene content=38 mol %)

Substrate sheet: biaxially drawn polyester film (25 μm thick)

Acid-modified polyolefin adhesive: "Adomer" resin of Mitsui Petrochemical Industries, Ltd. (coated in a thickness of 20 μm)

Conditions of extrusion:
L/D of screw=24
cylinder temperature=180° C., 200° C., 220° C.
adapter temperature=220° C.
T die temperature=220° C.
thickness of laminate=15 μm
temperature of chill roll=40° C.
die gap width=3 mm.

(3) Using an extrusion laminator of the type shown in FIG. 2, an ethylene/vinyl alcohol copolymer resin (see below) was extrusion-laminated under the conditions specified below, whereby a hologram forming sheet was prepared. An aluminum layer was vacuum-evaporated on the hologram pattern forming surface of this sheet. The resulting sheet was designated sample 12-3.

Ethylene/vinyl alcohol copolymer resin: "Soanol E3808" of Nippon Synthetic Chemical Industry Co., Ltd. (ethylene content=38 mol %)

Conditions of extrusion:
L/D of screw=24
cylinder temperature=160° C.,
adapter temperature=180° C.
T die temperature=220° C.
thickness of laminate=20 μm
temperature of chill roll=40° C.
die gap width=3 mm.

(4) Using an extrusion laminator of the type shown in FIG. 6, an ethylene/vinyl alcohol copolymer resin with 45 mol % ethylene (see below) was extrusion-laminated over a substrate sheet under the same conditions as those used in preparing sample 12-1, whereby a hologram forming sheet was prepared. An aluminum layer was vacuum-evaporated on the hologram pattern forming surface of this sheet. The resulting sheet was designated sample 12-4.

Ethylene/vinyl alcohol copolymer resin: "Soanol" resin of Nippon Synthetic Chemical Industry Co., Ltd. (ethylene content=45 mol %)

(5) Using an extrusion laminator of the type shown in FIG. 6, the procedure of preparing sample 12-1 was repeated except that a low-density polyethylene was used as the resin to be extruded, whereby a comparative hologram forming sheet was prepared. An aluminum layer was vacuum-evaporated on the hologram pattern forming surface of this sheet. The resulting sheet was designated as comparative sample 12-1.

(6) Using an extrusion laminator of the type shown in FIG. 6, an ethylene/vinyl alcohol copolymer resin with an ethylene content of 50 mol % (see below) was extrusion-laminated over a substrate sheet under the same conditions as those used in preparing sample 12-1, whereby an additional comparative hologram forming sheet was prepared. An aluminum layer was vacuum-evaporated on the hologram pattern forming surface of this sheet. The resulting sheet was designated as comparative sample 12-2.

Ethylene/vinyl alcohol copolymer resin: "Soanol" resin of Nippon Synthetic Chemical Industry Co., Ltd. (ethylene content=50 mol %).

A highly visible hologram pattern was formed in samples 12-1 to 12-4. However, the hologram pattern formed in comparative sample 12-1 was not highly visible.

Samples 12-1 to 12-4 and comparative samples 12-1 and 12-2 were subjected to a peel test (for the test procedure, see Experiment 11). The test results were as follows: samples 12-1 to 12-4 had good adhesion between the resin surface and the evaporated aluminum layer, but the aluminum layer in each of comparative samples 12-1 and 12-2 separated very easily.

Further, in order to evaluate their keeping quality, samples 12-1 to 12-4 and comparative samples 12-1 and 12-2 were left to stand at 60° C. for 1 month. No change was observed in the hologram patterns in samples 12-1 to 12-4 but the hologram patterns in comparative samples 12-1 and 12-2 blurred with time.

These results clearly demonstrate the effectiveness of the present invention.

In the first to ninth examples of the present invention, it is also possible to use as polyethylene resin having a Vicat softening point (ASTM D/1525) of at least 90° C. in place of the polypropylene resin having a Rockwell hardness of at least 70. Polyethylene resins, in particular low-density polyethylene resins, are most commonly used in extrusion coating and they are not only easy to process but also inexpensive. It is therefore possible to fabricate hologram forming sheets from polyethylene resins by the processes described on the foregoing pages. However, compared to the polypropylene resins, amorphous polyesters and ethylene/vinyl alcohol copolymers described above, polyethylene resins are relatively soft, so that if the sheets with a formed hologram pattern are wound up and stored for a prolonged time, it often occurs that the hologram pattern becomes darker and its gloss decreases with time.

Nevertheless, in certain applications of hologram forming sheets, cost reduction is a more important element of consideration than the quality of hologram pattern. The present inventors have found that both requirements for quality and cost reduction can be met by using a polyethylene resin having a Vicat softening point of at least 90° C. In order to attain improved adhesion to the reflecting metal layer which is to be provided on the hologram pattern forming surface, the surface of the polyethylene resin having a Vicat softening point of at least 90° C. on which the hologram pattern is formed is subjected to a preliminary corona discharge treatment so that it will have a wetness index of at least 40 dynes.

Examples of the case where this polyethylene resin having Vicat softening point of at least 90° C. is used in place of the polypropylene resin having a Rockwell hardness of at least 70 are described below with reference to the results of experimental runs conducted in line with this case.

EXPERIMENT 13

(1) Using an extrusion laminator of the type shown in FIG. 6, a low-density polyethylene resin (see below) was extrusion-laminated over a substrate sheet (see below) under the conditions of extrusion specified below, whereby a hologram forming sheet was prepared. An aluminum layer was vacuum-evaporated on the hologram pattern forming surface of this sheet. The resulting sheet was designated sample 13-1.

Low-density polyethylene resin=M-16P of Mitsui Petrochemical Industries, Ltd. (MFR=3.7 g/10 min; density=0.932 g/cm$^3$; Vicat softening point=95° C.)

Substrate sheet: biaxially drawn polyester film (25 μm thick)

Conditions of extrusion:
L/D of screw=24
cylinder temperature=140° C., 180° C., 220° C.
adapter temperature=280° C.
T die temperature=290° C.
thickness of liminate=30 μm
temperature of chill roll=23° C.

The aluminum layer was vacuum-evaporated to a thickness of 400 Å after the hologram pattern forming surface was given a corona discharge treatment to have a wetness index of 40 dynes.

(2) A hologram forming sheet was prepared by repeating procedure for the preparation of sample 13-1 except that the low-density polyethylene resin specified below was extrusion-laminated over a substrate sheet. An aluminum layer was vacuum-evaporated on the hologram pattern forming surface of this sheet. The resulting sheet was designated sample 13-2.

Low-density polyethylene resin=C-260-4P of Mitsui Petrochemical Industries, ltd. (MFR=2.5 g/10 min; density=0.932 g/cm$^3$; Vicat softening point=109° C.).

(3) A comparative hologram forming sheet was prepared by repeating the procedure for the preparation of sample 13-1 except that the low-density polyethylene resin specified below was extrusion-laminated over a substrate sheet. An aluminum layer was vapor-evaporated on the hologram pattern forming surface of this sheet. The resulting sheet was designated as comparative sample 13-1.

Low-density polyethylene resin=M-10P of Mitsui Petrochemical Industries, Ltd. (MFR=9.5 g/10 min; density=0.917 g/cm$^3$; Vicat softening point=85° C.).

A length of 2,000 m of each of the three samples was wound up and stored at a temperature of 30° C. The appearance of the hologram pattern in each sample in the neighborhood of the roll onto which they were wound was examined and the results are shown in the following table.

| Sample No. | Time-dependent change in hologram pattern | | |
|---|---|---|---|
| | 1 wk | 4 wk | 12 wk |
| 13-1 | good | good | became somewhat dark |
| 13-2 | good | good | good |
| Comparison 13-1 | became somewhat dark | Poor | poor |

As the above data shows, the keeping quality of the hologram pattern increased with Vicat softening point of the polyethylene resin. Practical purposes, hologram forming sheets in an as-wound state have to withstand storage for at least about 4 weeks, and to this end, it is necessary to use a polyethylene resin having a Vicat softening point of at least 90° C.

What is claimed is:

1. A hologram forming sheet comprising a polypropylene resing sheet with a Rockwell hardness of at least 70 and a hologram pattern forming surface provided on one side of said polypropylene resin sheet, said hologram pattern forming surface being provided simultaneously with the molding of said polypropylene resin sheet in such a way that a polypropylene resin with a Rockwell hardness of at least 70 that has been extruded as a molten thin film from a T die is pressed and cooled with a chill roll equipped with a hologram relief master plate on its peripheral surface.

2. A hologram forming sheet according to claim 1, further comprising a reflecting metal layer over the hologram pattern forming surface.

3. A hologram forming sheet according to claim 1, futher comprising a reflecting metal layer in an area of the hologram pattern forming surface in which a hologram pattern having metallic gloss needs to be provided.

4. A hologram forming sheet according to claim 1, further comprising a heat-fusible resin layer on the hologram pattern forming surface, said heat-fusible resin layer having a melting point at least 10° C. lower than the Vicat softening point of the polypropylene resin sheet.

5. A hologram forming sheet according to claim 4, further comprising a reflecting metal layer between the hologram pattern forming surface and the heat-fusible resin layer.

6. A hologram forming sheet according to claim 4, further comprising a reflecting metal layer in an area between the hologram pattern forming surface and the heat-fusible resin layer in which a hologram pattern having metallic gloss needs to be provided.

7. A hologram forming sheet according to claim 1, further comprising an ink layer in an area of the hologram pattern forming surface in which a hologram pattern does not need to be provided, as well as a reflecting metal layer that is provided on said hologram pattern and covers said ink layer.

8. A hologram forming sheet according to claim 1, further comprising a reflecting metal layer on the hologram pattern forming surface, as well as an opaque ink layer in an area, in which a hologram pattern having metallic gloss does not need to be provided, of the side of the polypropylene resin sheet which is opposite to the side where the hologram pattern forming surface is provided.

9. A hologram forming sheet according to claim 1, further comprising a sheet of paper on the side of the polypropylene resin sheet which is opposite to the side where the hologram pattern forming surface is provided.

10. A hologram forming sheet according to claim 1, further comprising a tackifier layer and a release paper superposed in that order on the side of the polypropylene resin sheet which is opposite to the side where the hologram pattern forming surface is provided.

11. A hologram forming sheet comprising a substrate sheet, a polypropylene resin layer with a Rockwell hardness of at least 70 that is formed on one side of said substrate sheet, and a hologram pattern forming surface provided on said polypropylene resin layer, said hologram pattern forming surface being provided simultaneously with the molding of said polypropylene resin layer in such a way that a polypropylene resin with a Rockwell hardness of at least 70 that has been extruded onto one side of the substrate sheet as a molten thin film from a T die is pressed and cooled with a chill roll equipped with a hologram relief master plate on its peripheral surface.

12. A hologram forming sheet according to claim 11, further comprising a reflecting metal layer over the hologram pattern forming surface.

13. A hologram forming sheet according to claim 11, further comprising a reflecting metal layer in an area of the hologram pattern forming surface in which a hologram pattern having metallic gloss needs to be provided.

14. A hologram forming sheet according to claim 11, further comprising a heat-fusible resin layer on the hologram pattern forming surface, said heat-fusible resin layer having a melting point at least 10° C. lower than the Vicat softening point of the polypropylene resin layer.

15. A hologram forming sheet according to claim 14, further comprising a reflecting metal layer between the hologram pattern forming surface and the heat-fusible resin layer.

16. A hologram forming sheet according to claim 14, further comprising a reflecting metal layer in an area between the hologram pattern forming surface and the heat-fusible resin layer in which a hologram pattern having metallic gloss needs to be provided.

17. A hologram forming sheet according to claim 11, further comprising an ink layer in an area of the hologram pattern forming surface in which a hologram pattern does not need to be provided, as well as a reflecting metal layer that is provided on said hologram pattern and covers said ink layer.

18. A hologram forming sheet according to claim 11, further comprising a reflecting metal layer on the hologram pattern forming surface, as well as an opaque ink layer in an area, in which a hologram pattern having metallic gloss does not need to be provided, of the side of the substrate sheet opposite to the side where the polypropylene resin layer is formed.

19. A hologram forming sheet according to claim 11, further comprising a sheet of paper on the side of the substrate sheet which is opposite to the side where the polypropylene resin layer is formed.

20. A hologram forming sheet according to claim 11, further comprising a tackifier layer and a release paper superposed in that order on the side of the substrate sheet which is opposite to the side where the polypropylene resin layer is formed.

* * * * *